United States Patent [19]
Bekker et al.

[11] Patent Number: 4,547,428

[45] Date of Patent: Oct. 15, 1985

| [54] | TERPOLYMER PROCESSING AID FOR POLYVINYL HALIDE POLYMERS |
|---|---|
| [75] | Inventors: Vladimir Bekker, St. Louis; Wayne J. Buchheim, Ballwin; William Vanderlinde, Creve Court; Donald S. T. Wang, St. Louis, all of Mo. |
| [73] | Assignee: Monsanto Company, St. Louis, Mo. |
| [21] | Appl. No.: 477,694 |
| [22] | Filed: Mar. 21, 1983 |
| [51] | Int. Cl.$^4$ .................. C08L 33/00; B32B 5/16; B32B 27/14 |
| [52] | U.S. Cl. .................. 428/402; 523/342; 524/460; 524/820; 524/821; 525/304; 526/324; 528/501 |
| [58] | Field of Search .......... 524/460, 820, 821; 525/304; 526/317, 324; 428/402; 528/501; 523/342 |

[56] References Cited

U.S. PATENT DOCUMENTS

| 2,646,417 | 7/1953 | Jennings | 260/45.5 |
| 2,851,444 | 9/1958 | Wesp et al. | 260/78.5 |
| 3,073,791 | 1/1963 | Barkhuff | 524/831 |
| 3,296,175 | 1/1967 | Fantl et al. | 524/820 |
| 3,720,636 | 3/1973 | Wollner et al. | 524/824 |
| 4,206,292 | 6/1980 | Ohya et al. | 525/85 |

OTHER PUBLICATIONS

Derwent Abst., 10392, K/05 (11-1982) J57187289.
Derwent Abst., 10562, D/07 (12-1980) J55157611.
Derwent Abst., 72555, D/40 (8-1981) J56103211.

*Primary Examiner*—Herbert J. Lilling
*Attorney, Agent, or Firm*—A. Milton Cornwell; Jon H. Beusen; Paul D. Matukaitis

[57] ABSTRACT

A terpolymer comprising repeating units derived from an olefin, a diester of an addition polymerizable unsaturated dicarboxylic acid, and a solubilizing monomer which promotes compatibility between the terpolymer and a vinyl halide polymer. A granular form of the processing aid and a method for its preparation are also disclosed.

28 Claims, 8 Drawing Figures

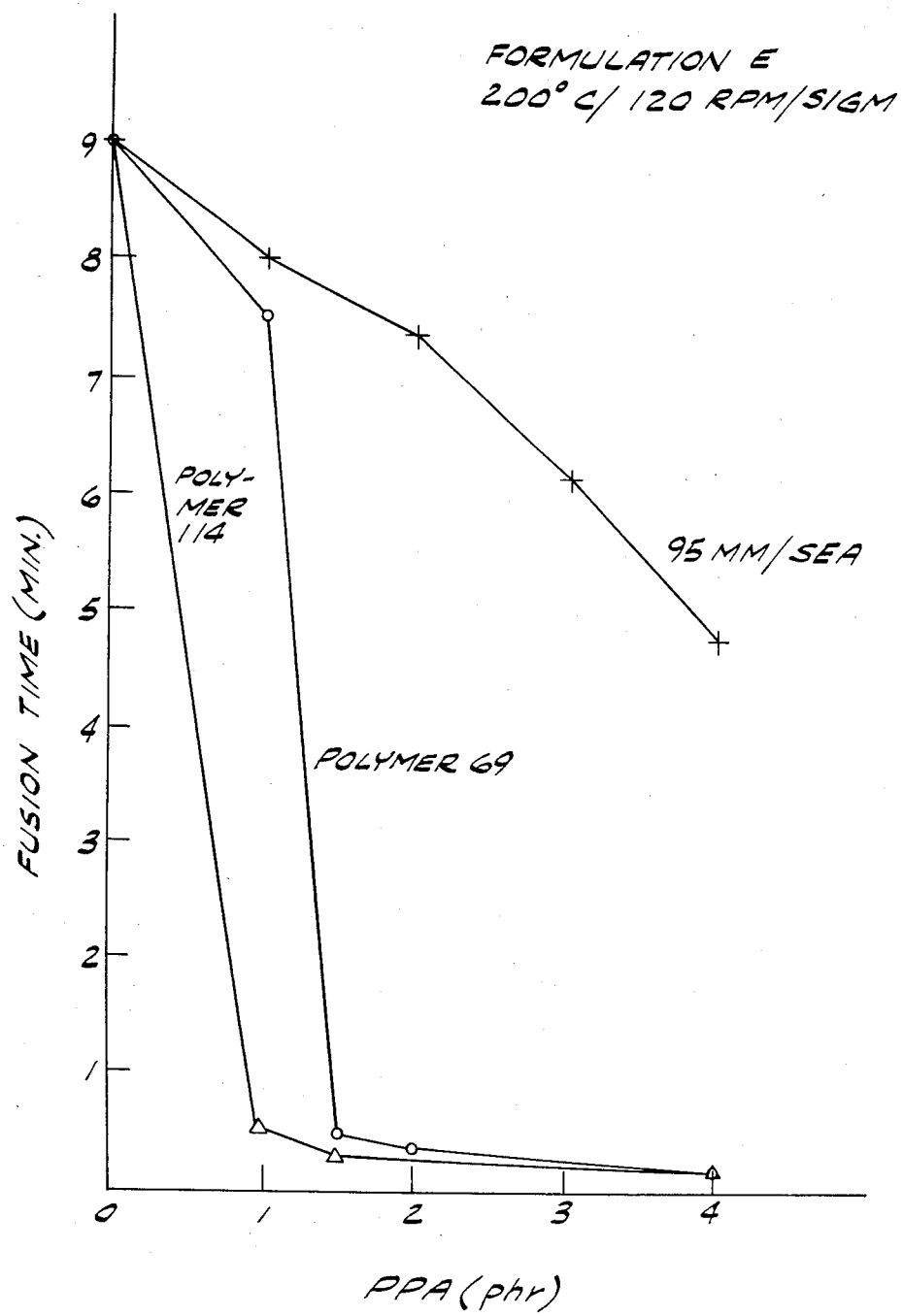

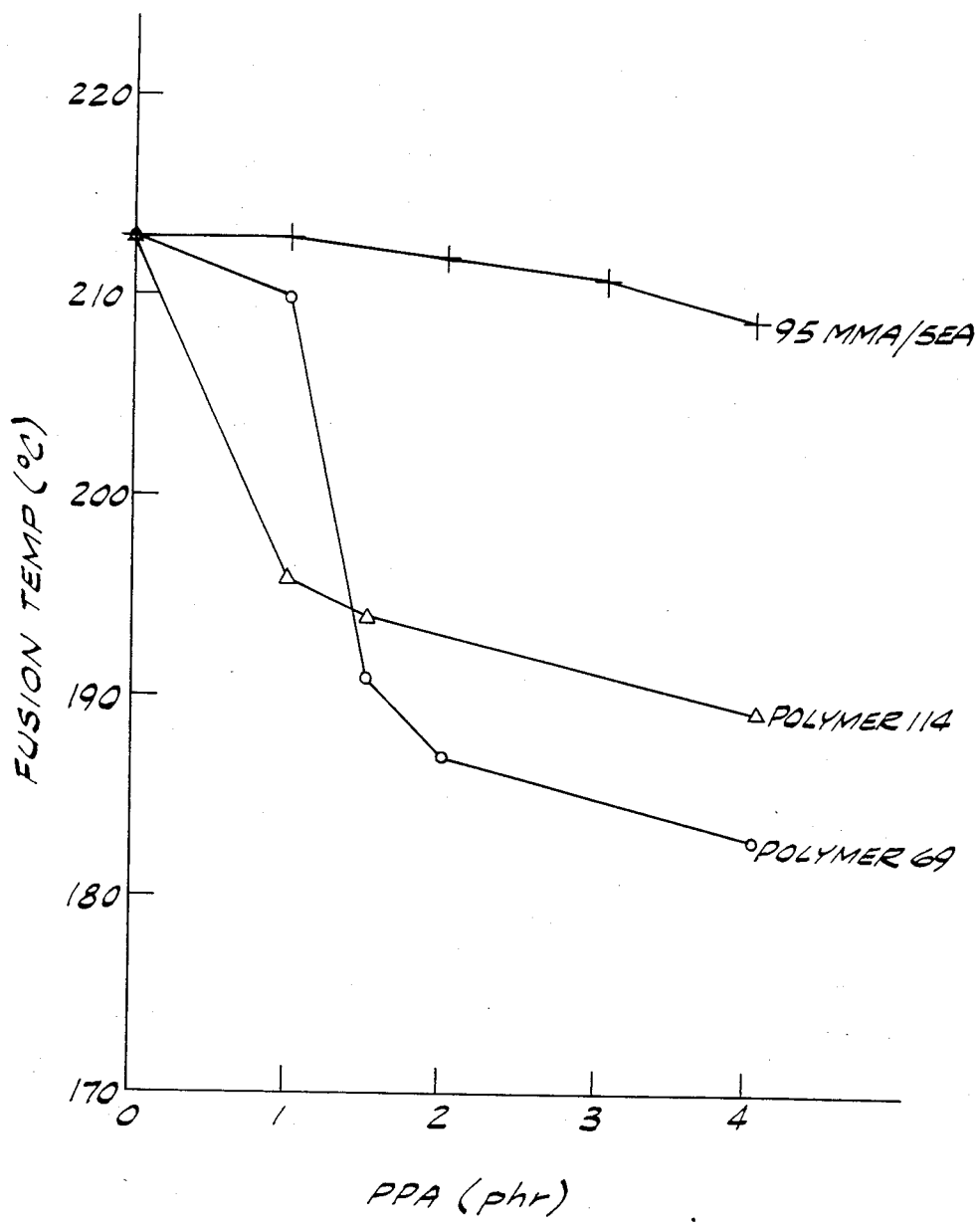

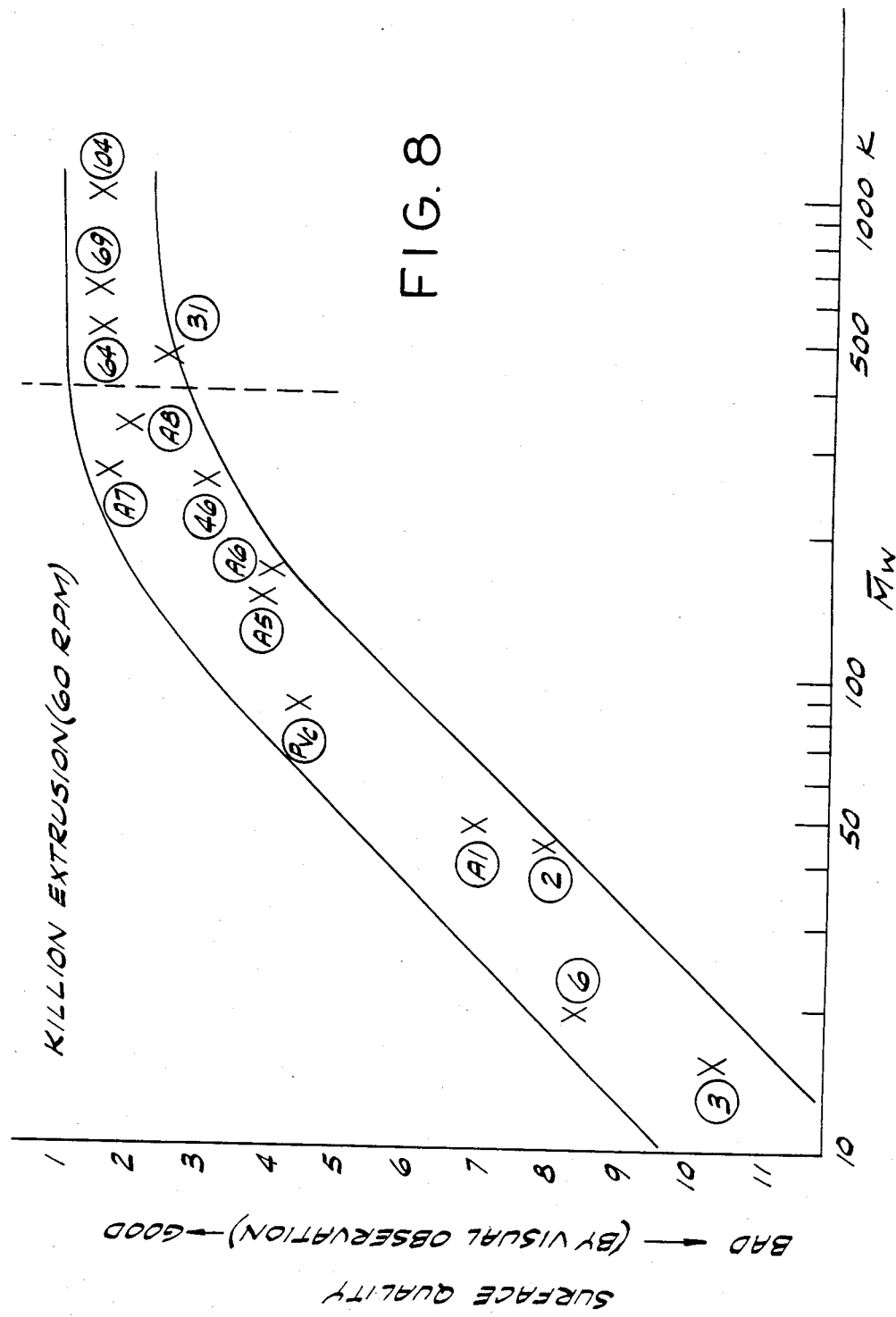

TERPOLYMER PROCESSING AID FOR POLYVINYL HALIDE POLYMERS

BACKGROUND OF THE INVENTION

This invention relates to the field of producing shaped articles from polyvinyl halide polymers and, more particularly, to improved processing aids for use in molding, calendering, extrusion or other mechanical processing of polyvinyl halides.

Polyvinyl halides such as polyvinyl chloride (PVC) possess service properties which commend their use in a variety of applications. The electrical resistivity of PVC has led to widespread use as a wire and cable insulation. A substantial industry in PVC pipe and conduit has been made possible by the mechanical strength of the polymer and its resistance to water and solvents. A very substantial volume of PVC is also consumed in the manufacture of film, foam and a variety of products produced by extrusion and injection molding.

Because of the hardness of vinyl chloride homopolymer and its susceptibility to thermal degradation, mechanical processing of the homopolymer has required substantial use of plasticizers to render it more readily workable, and heat stabilizers to prevent degradation at mechanical processing temperatures. A variety of other additives including lubricants, fillers, and impact modifiers are conventionally compounded with vinyl chloride homopolymer to provide compositions suited for use in calendering, injection molding, extrusion and other mechanical working processes.

Although plasticizers soften PVC, increase its flexibility, and generally facilitate its processing, the presence of plasticizers may alter the mechanical strength of the polymer and the shaped articles produced therefrom. If blending and processing are not properly controlled, or if conditions of use are severe, plasticizers may tend to bleed or weep from the surfaces of the PVC product. There has thus been a need in the art for means facilitating the processing of polyvinyl halide polymers while minimizing adverse effects on the end product.

In response to this need, various polymer processing aids (PPAs) have been developed. These PPAs are typically polymeric materials that are blended with the polyvinyl halide polymer prior to processing. They are intended to facilitate processing by promoting rapid fusion, lowering melt viscosity, improving melt strength, improving surface quality and lowering melt temperature, without diminishing the physical properties of the end product produced from the polyvinyl halide. Among the commercially available PPAs are various copolymers that are predominantly constituted of methyl methacrylate, for example, Rohm & Haas's "K-120-N", or of styrene or substituted styrene, for example, "Amoco 18." While both of these types are useful processing aids, a need has remained in the art for PPAs which provide rapid fusion while exhibiting a high compatibility with polyvinyl halide polymers and not reducing the heat deflection temperature of shaped articles produced from polyvinyl halide blends containing the PPA. Certain of the commercial processing aids also tend to cause swelling of extruded PVC as it emanates from the die. There has, thus, been a need for PPAs which provide processability with minimum die swell. Further continuing needs have persisted for PPAs which preserve the clarity of sheets and film and which provide the lowest feasible melt viscosity so as to maximize productivity and minimize power consumption during mechanical processing of the vinyl halide polymer.

Jennings U.S. Pat. No. 2,646,417 describes vinyl halide compositions which contain a high molecular weight interpolymer of styrene and acrylonitrile as a processing aid. Optionally the styrene/acrylonitrile copolymer can contain up to 20% by weight of another monoolefinic monomeric material. The third monomer may be selected from a long list of vinyl esters, acrylic and α-alkyl acrylic acids, their alkyl esters, their amides, and their nitriles, vinyl alkyl ethers and ketones, and alkyl esters of maleic and fumaric acid. The exemplary disclosure describes a copolymer containing 75% styrene and 25% acrylonitrile, and a terpolymer containing 65% styrene, 25% acrylonitrile and 10% ethyl acrylate, as processing aids for the vinyl halide polymer.

Barkhuff et al. U.S. Pat. No. 3,073,791 describes an emulsion interpolymer of an alkyl ester of fumaric acid, an unsaturated acid such as acrylic, cinnamic, atropic or crotonic, a hardening comonomer such as styrene, and optionally, an unsaturated nitrile. The product is a film former described as useful in textile finishing.

Wesp et al. U.S. Pat. No. 2,851,444 discloses terpolymers of styrene, dialkyl fumarate and at least 2% of a third monomer which may be of a different dialkyl fumarate. Exemplified are terpolymers of styrene/methacrylic acid/diethyl fumarate and vinyltoluene/methacrylonitrile/methacrylic acid. The disclosure is primarily concerned with the preparation of clear terpolymers which may be selected from a narrow range of compositions along a line joining binary polymerization azeotropes on a three component monomer composition diagram. Polymerization azeotropes are described as monomer compositions containing such relative proportions of monomers that, when subjected to batchwise bulk polymerization, copolymers are formed having the same composition as the monomer mixture. The terpolymers described by Wesp et al. are film forming polymers that can be blended with other polymers, plasticizers, solvents, fillers, pigments, dyes, stabilizers and the like.

SUMMARY OF THE INVENTION

Among the several objects of the present invention may be noted the provision of novel processing aids for use in the mechanical processing of vinyl halide polymers, particularly vinyl chloride polymers; the provision of such novel processing aids which promote more rapid fusion of the vinyl halide polymer during processing, thereby lowering the necessary proportions of heat stabilizer, lowering the processing temperature, increasing throughput, and reducing energy requirements in processing; the provision of such processing aids which do not significantly reduce the clarity of the processed polyvinyl halide; the provision of such processing aids which promote improved pigment dispersion in a polyvinyl halide polymer blend; the provision of such processing aids which provide improved mold definition, mold release and mold filling rates in the injection molding of polyvinyl halide polymer compositions; the provision of such processing aids which reduce wear and corrosion of processing equipment in the injection molding or extrusion of polyvinyl halide compositions; the provision of such polymer processing aids which minimize die swell in the extrusion of polyvinyl halide compositions; the provision of such processing aids which facilitate mechanical processing without reducing the heat deflection temperature or other important properties of the processed polymer; the provision of such processing aids which provide improved efficiency by comparison with the PPAs previously available for polyvinyl halide polymers; the provision of such processing aids which impart improved weatherability to a product produced from a polyvinyl halide polymer blend containing the processing aid; the provision of such processing aids which do not significantly alter impact strength; the provision of processes for the manufacture of such processing aids; and the provision of such processing aids in a form resistant to dusting and processes for the preparation of dust resistant granular processing aids.

Briefly, therefore, the invention is directed to a terpolymer having a molecular weight of at least about 100,000 and a glass transition temperature of at least about 50° C. The terpolymer comprises between about 30% and about 90% by weight repeating units derived from an olefin, between about 1% and about 30% by weight repeating units derived from a diester of an addition polymerizable dicarboxylic acid, and between about 1% and about 40% by weight repeating units derived from a solubilizing monomer which promotes compatibility of the terpolymer with a vinyl halide polymer.

The invention is further directed to a terpolymer having a molecular weight of at least about 100,000 and a glass transition temperature of at least about 50° C. The terpolymer comprises repeating units derived from an olefin, a diester of an addition polymerizable unsaturated dicarboxylic acid, and a solubilizing monomer which promotes compatibility of the terpolymer with a vinyl halide polymer, all in the aforesaid ranges of proportions. The terpolymer has a non-random distribution of repeating units, a terminal portion thereof containing a proportion of the solubilizing monomer at least sufficient to impart dispersive compatibility with the vinyl halide polymer.

Further included in the invention are granular polymer processing aids comprising terpolymers of each of the aforesaid types, said granular processing aids each having a particle size of between about 1/64" (0.4 mm) and about 1/16" (1.6 mm).

The invention is further directed to a process for preparing an addition terpolymer. In this process, an emulsion polymerization medium is prepared comprising water, surfactant and a free radical initiator. An olefin, a diester of an addition polymerizable unsaturated dicarboxylic acid, and a solubilizing monomer which promotes compatibility of the terpolymer with the vinyl halide polymer are slowly added to the emulsion polymerization medium and copolymerized therein. The proportions of diester and solubilizing monomer are as defined above.

Other objects and features will be in part apparent and in part pointed out hereinafter.

BRIEF DESCRIPTION OF THE DRAWINGS

FIG. 5 sets forth plots of fusion time vs. PPA level for fusion tests conducted in a Brabender plasticorder on three PVC blends, one containing a commercially available PPA and the other two containing one of the terpolymer PPAs of the invention;

FIG. 6 set forth plots of fusion temperature vs. PPA level for the same blends whose fusion time curves are reflected in FIG. 5;

FIG. 8 is a plot of surface quality vs. PPA molecular weight for various PPAs subjected to Killion extrusion tests.

DESCRIPTION OF THE PREFERRED EMBODIMENTS

Figure 1:
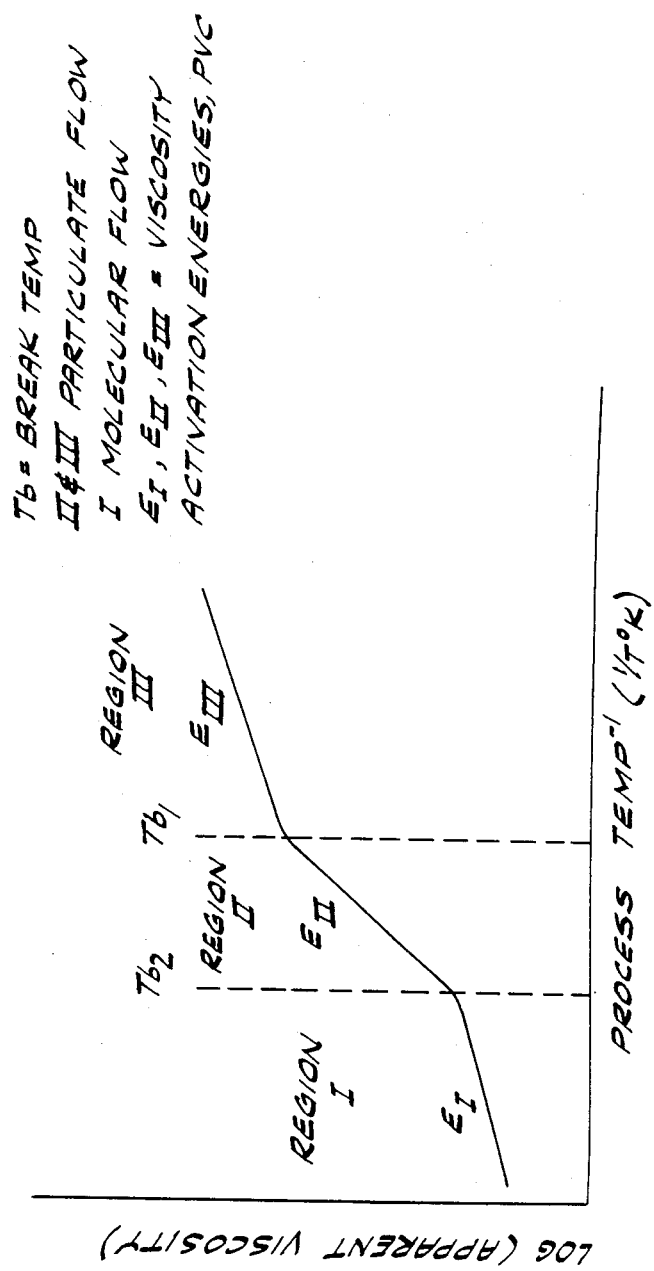
FIG. 1 is a typical plot of the logarithm of apparent viscosity vs. the reciprocal of temperature in the mechanical processing of PVC.

In accordance with the present invention, it has been discovered that mechanical processing of polyvinyl halide polymers is facilitated by the use of novel terpolymer processing aids. By use of these processing aids, the fusion temperature of a polyvinyl halide polymer, such as polyvinyl chloride, is significantly reduced without any significant adverse effect on the end use properties of a shaped article fabricated from a blend of the processing aid and the polyvinyl halide polymer. The presence of the processing aid serves to lower the melt viscosity and lower the melt temperature, and also improve the dynamic thermal stability, hot tear strength, hot elongation and surface quality of the polyvinyl halide composition which contains it. Rapid fusion and relatively lower melt temperature and viscosity promote high productivity in the calendering, injection molding, extrusion or other mechanical processing operations to which the polyvinyl halide polymer is subjected in the production of various shaped article products. While PPAs generally tend to cause die swell in the extrusion of polyvinyl halide polymers, it has been found that the PPAs of the invention minimize die swell as compared, for example, to PPAs based on methyl methacrylate.

The terpolymer of the invention is preferably produced in particulate form, having a particle size distribution such that at least about 90% by weight of the particles are smaller than about 100 microns. In order to function satisfactorily as a processing aid, it should have a glass transition temperature of at least about 50° C., preferably 60°–100° C., and most preferably 80°–100° C., as measured by ASTM method D3418 (1982). To prevent its acting as a plasticizer which diminishes the mechanical properties of the polyvinyl halide end product, it is also important that the terpolymer have a relatively high molecular weight. For this purpose and to provide good surface quality of PVC processed with the terpolymer, the terpolymer molecular weight is preferably at least about 100,000, more preferably 500,000–2,000,000 (weight average), as measured by gel permeation chromatography. Molecular weights above about 3,000,000 may be undesirable if associated with glass transition temperatures significantly higher than 100° C. Optimally, the molecular weight is in the range of 800,000 to 1,500,000.

Although we do not wish to be held to a particular theory, it is believed that terpolymers containing repeating units derived from a diester of an addition polymerizable unsaturated carboxylic acid provide rapid fusion at relatively low fusion temperature by promoting interparticle friction between the particles of polyvinyl halide polymer. Use of styrene or other vinyl aromatics as the olefin component further contributes to rapid fusion, apparently by further promoting interparticle friction, by solvation of the polyvinyl halide, or both. By whatever mechanism, the PPAs of the invention provide exceptionally rapid fusion, as much as thirty times more rapid than that obtained with methyl methacrylate based PPAs. Moreover, the novel PPAs facilitate processing without significantly reducing the PVC end use properties. To the extent that interparticle friction is promoted, the effect of the processing aid is believed to be the reverse of that obtained with those plasticizers which operates as internal lubricants to promote interparticle movement with minimal friction.

Studies of PVC microstructure morphology and flow rheology indicate that solid state PVC is constituted of a microdomain of nodules about 0.01 micron in diameter which are arranged in the form of microgranules (globules) of approximately 1 micron in size. In the solid state, the globules are agglomerated to form PVC granules approximately 100 microns in size. In the mechanical processing of PVC, analysis suggests that the granules are broken down to globules in one temperature range and the globules further broken down to the microdomain structure in a higher temperature range. This two step breakdown may be characterized as equivalent to a consecutive first order reaction with a characteristic reaction energy. Thus, if the logarithm of apparent viscosity is plotted against the reciprocal of the processing temperature as shown in FIG. 1, there are two breaks in the slope of the curve. Processing in the temperature region below $Tb_1$, the first break temperature, is considered to involve primarily breakdown of granules to globules, while the temperature region between $Tb_1$ and the second break temperature ($Tb_2$) predominantly involves breakdown of globules to nodules. Based on a consecutive first order model, the composition of the PVC microstructure as a function of temperature and processing time may be represented as in FIG. 2. Thus, the concentration of globules reaches a maximum at about $Tb_1$, the concentration of nodules (microdomain) reaches a plateau at approximately $Tb_2$, and the fusion temperature is considered to be between $Tb_1$ and $Tb_2$.

Figure 2:
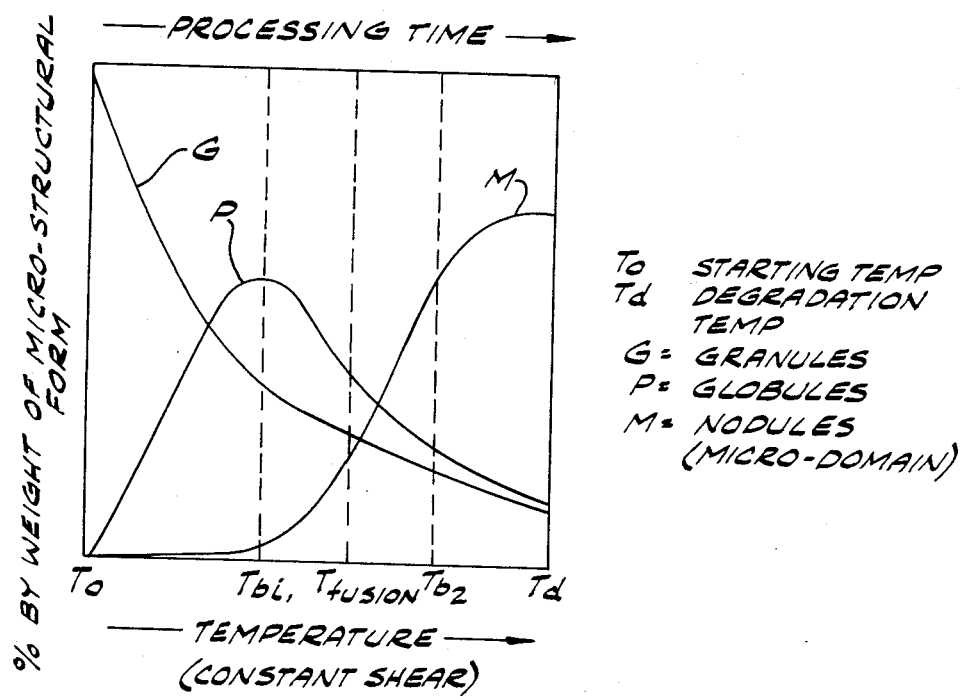
FIG. 2 is an idealized plot of the concentrations of PVC granules, globules and nodules, respectively, vs. processing temperature and processing time based on a postulated first order particle breakdown phenomenon in the mechanical processing of PVC.

Because apparent viscosity is also affected by shear, especially in regions II and III of FIGS. 1 and 2, the shapes of the viscosity vs. reciprocal temperature and particle concentration vs. temperature/processing time curves also vary based on the extent of agitation. In Regions III and II, the viscosity activation energy is shear rate dependent, while in Region I, it is not so dependent. This indicates that a shear rate dependent particle flow system prevails in Regions III and II, while a more Newtonian molecular flow system prevails in Region I.

Figure 4:
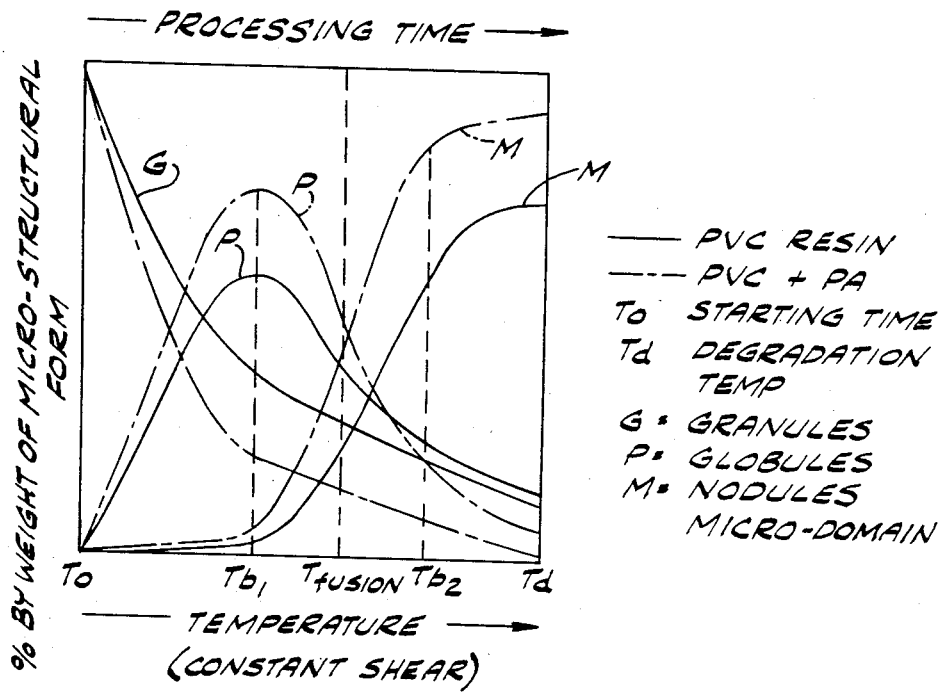
FIG. 4 sets forth curves of the type shown in FIG. 2 and a second set of curves illustrating the effect PPAs are believed to exert on the kinetics of PVC particle breakdown in mechanical flow processing.
Figure 3:
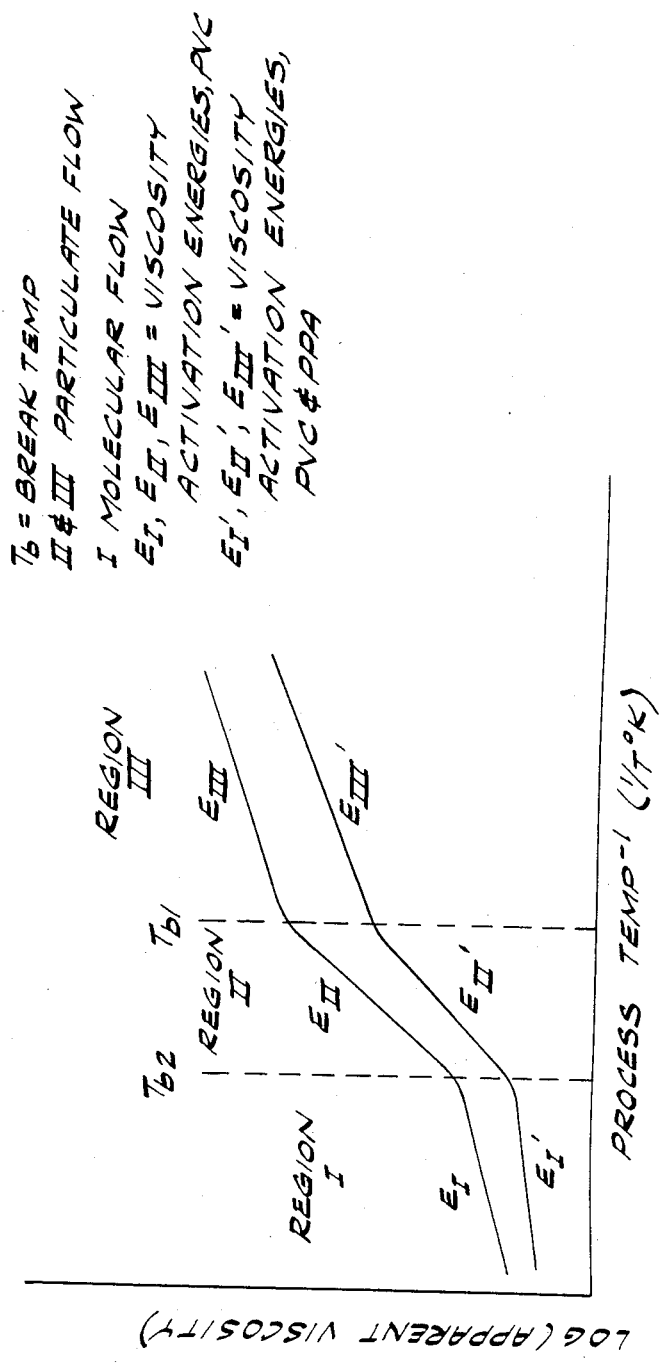
FIG. 3 sets forth the curve of FIG. 1 and a second curve illustrating the general effect of PPAs on apparent viscosity and viscosity activation energy.

By use of the processing aids of the invention, it has been found that, at a given shear rate, the log of viscosity vs. reciprocal temperature curve is translated downwardly. It has further been found that the viscosity activation energy, i.e., the slope of this curve is also reduced significantly, especially in region I. This is illustrated ideally in FIG. 3. Although FIG. 3 is illustrative and not intended to quantitatively reflect the effect of any particular PPA, it does indicate the manner in which the PPAs of the invention influence rheology and facilitate processing. Thus, by use of the processing aids of the invention, rapid fusion is achieved at relatively low temperatures with relatively low energy input. Melt viscosities are also measurably lower at temperatures in the region of $Tb_2$. The effect of the processing aids on the morphology of the PVC resin is conceptually illustrated in FIG. 4.

It will be noted that, at a given processing time and temperature, use of PPAs provides a higher fusion percentage, i.e., proportion of PVC particles in the microdomain structure. Generally, however, a very high microdomain content is associated with die swell. Because the PPAs of the invention cause only minimal die swell, it appears that they achieve an optimum flow viscosity at a relatively low percentage of fusion as compared to the methyl methacrylate based PPAs.

In the terpolymers of the invention, the olefin component is most preferably styrene. However, various other nuclear substituted styrenes such as vinyltoluene, chlorostyrene, lower alkyl styrenes and other vinyl aromatics are also suitable. Alternatively, but less preferably, various alkenes such as ethylene, propylene and butylene may comprise the olefin component. Generally, the olefin constitutes 30–90% by weight, preferably 60–85% by weight of the terpolymer.

Dialkyl fumarates such as, for example, diethyl fumarate, methyl ethyl fumarate, ethyl propyl fumarate, dibutyl fumarate and ethyl butyl fumarate are preferred as the diester component of the terpolymer. Diesters of itaconic acid are also highly suitable. Diesters of other monounsaturated dicarboxylic acids such as maleic and tetrahydrophthalic acid can also be utilized, but are less preferred. In addition, to the dialkyl diesters, alkyl aryl and diaryl esters may also be employed. Among the useful alkyl moieties, in both dialkyl and aryl alkyl diesters, are aralkyl radicals such as benzyl, phenylethyl and phenylbutyl. As noted, it is believed that the diester component plays a key role in promoting interparticle friction in the polyvinyl halide composition, thus lowering melt temperature and promoting rapid fusion. To some degree, it also appears to enhance compatibility with PVC. While the diester content of the terpolymer can be varied fairly widely, the combination of olefin and diester should be sufficient for the terpolymer to reduce the fusion temperature of a vinyl halide polymer in the mechanical processing of a blend of the polyvinyl halide and the terpolymer, without substantial adverse effect on the heat deflection temperature of a shaped article produced from the blend. Generally, the diester may constitute between about 1 and about 30% by weight of the terpolymer, most preferably 5–20% by weight.

Because neither the olefin nor the diester component of the terpolymer has adequate compatibility with a polyvinyl halide resin, a third monomer is incorporated for the purpose of imparting compatibility. This solubilizing monomer is also preferably a highly reactive monomer that promotes complete reaction of the diester monomer, which by itself has relatively low reactivity. Most preferably, the solubilizing monomer is acrylonitrile or methacrylonitrile. However, other reactive monomers may be used which have a solubility parameter within about 1.5 $(cal./cm^3)^{\frac{1}{2}}$ of that of the polyvinyl halide. For PVC homopolymer, the solubility parameter is about 9.0 (cal/cm$^3$)$^{\frac{1}{2}}$. Suitable solubilizing monomers include acrylic acid, methacrylic acid, methyl acrylate, methyl methacrylate, ethyl acrylate, ethyl methacrylate and other methacrylate and acrylate esters.

In the terpolymer of the invention, the proportion and distribution of solubilizing monomer is such as to impart at least dispersive compatibility with a polyvinyl halide with which the terpolymer is blended. Both random and nonrandom distributions of monomer repeating units are contemplated. In a random terpolymer, the solubilizing monomer should comprise about 1–40%, preferably about 10–20% by weight of the terpolymer chain. In a nonrandom structure, a terminal portion of the terpolymer should contain a sufficient proportion of solubilizing monomer units to impart the necessary compatibility. Compatibility is recognized to be a matter of degree, varying along a spectrum or continuum from complete mutual solubility to a distinctly two phase system. For purpose of this disclosure, a terpolymer is considered to exhibit dispersive compatibility with a polyvinyl halide if, after subjection to conventional operations of blending, extrusion and injection molding of the extruded blend, particle size of the dispersed PPA is not more than about $\frac{1}{3}\mu$.

Whether the monomer distribution is random or nonrandom, minor proportions of additional monomers can be used in the terpolymers. Thus, for example, it has been found advantageous to include a small proportion of a free acid such as fumaric acid or itaconic acid, for example, at a level of 0.01 to 5% by weight, to impart improved light stability to a polyvinyl halide polymer composition containing the terpolymer as a processing aid.

While, as noted above, the terpolymer can have either a random or nonrandom distribution of monomer repeating units, it is preferred that the distribution be nonrandom and that the solubilizing monomer units be preferentially concentrated at a terminal portion of the terpolymer in order to maximize the compatibility of the terpolymer with a polyvinyl halide polymer with which it is blended. In a particularly preferred embodiment, the terpolymer is segmented, having a first segment containing between about 30% and about 90% by weight, preferably about 60–85% by weight, of olefin, between about 1% and about 30% by weight, preferably about 5–20% by weight, of the diester monomer, and up to about 40% by weight, preferably about 10–20% by weight of the solubilizing monomer. A terminal segment of the terpolymer comprises between about 10% and about 90% by weight, preferably 60–80% by weight of the olefin, between about 10% and about 90% by weight, preferably about 20–40% by weight, of the solubilizing monomer, and between 0 and about 10% by weight of the diester, preferably none. Additionally, each segment may optionally contain minor proportions of recurring units derived from other addition polymerizable monomers and, as noted above, a small proportion of free dicarboxylic acid is preferred in order to enhance the light stability of polyvinyl halides with which the terpolymer processing aid is blended.

In the segmented polymer, there may be either a single terminal segment relatively rich in solubilizing monomer or terminal segments of such character on each end of the first segment. The first segment may either have a random or non-random distribution. In the latter instance, the first monomer segment may comprise two or more subsegments. In any case, the polymer is substantially linear and should contain between about 0.2 and about 1.0 parts by weight terminal segment per part by weight of the first or base segment. Thus, for example, the terpolymer of the invention may be represented by the formula

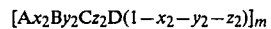

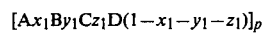

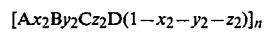

where A represents a repeating unit derived from the olefin, B represents a repeating unit derived from the diester monomer, C represents a repeating unit derived from the solubilizing monomer, D collectively represents repeating units derived from all other monomers, $x_1$ represents the mole fraction of olefin in the first segment and is between about 0.30 and about 0.90, $y_1$ represents the mole fraction of the diester monomer in the first segment and is between about 0.01 and about 0.30, $z_1$ represents the mole fraction of solubilizing monomer in the first segment and is not higher than about 0.40, $x_2$ represents the mole fraction of olefin in a terminal segment and is between about 0.10 and about 0.90, $y_2$ represents the mole fraction of diester monomer in a terminal segment and is not greater than about 0.10, $z_2$ represents the mole fraction of solubilizing monomer in a terminal segment and is between about 0.10 and about 0.90, p represents a number of equivalent repeating units and is sufficient to provide a molecular weight of at least about 50,000 in the first segment, and m and n represent the numbers of equivalent repeating units in the terminal segments, with m+n being between about 0.2 and about 1.0 p. Where the segmented polymer is produced by emulsion polymerization as described below, there is, for practical purposes, only a single terminal segment, i.e., m and n differ substantially, with one or the other tending towards zero.

A large variety of polymers within the aforesaid ranges of proportions are effective processing aids which provide rapid fusion of PVC at modest PPA levels. It has been found that very rapid fusion at relatively low PPA levels is achieved with segmented terpolymers containing dibutyl fumarate as the diester and styrene as the olefin. An especially effective PPA contains between about 14 and about 18 parts by weight dibutyl fumarate per 100 parts by weight terpolymer and, in the terminal segment, between about 4 and about 8 parts by weight acrylonitrile and between about 12 and about 16 parts by weight styrene per 100 parts by weight terpolymer.

In accordance with the process of the invention, the terpolymer processing aids are prepared by emulsion polymerization. Because of the disparity between the relatively high reactivities of the olefin and solubilizing monomers on one hand, and the relatively low reactivity of the diester monomer on the other, the reaction is preferably run under monomer "starved" conditions by slowly adding the monomers to a preheated emulsion polymerization medium at a rate such that the progress of the polymerization is limited by the monomer introduction rate rather than the kinetics of the polymerization. Under such circumstances, the unreacted diester monomer accumulates to a modest equilibrium concentration, after which it reacts at essentially the same rate that it is added to the emulsion system. As noted above, diester reacts more readily with the olefin or solubilizing monomer than it does with itself, so that continuous addition of the more reactive monomers also promotes complete reaction of the diester.

In carrying out the process of the invention, an emulsion polymerization system is initially prepared by adding a surfactant to deionized water. In one embodiment, both an anionic and a nonionic surfactant are used, typically about 1–3% by weight anionic and about 0.5–2% by weight nonionic. In this embodiment, various conventional surfactants of these types can be used, as is well known in the art of emulsion polymerization. Typically, the anionic surfactant is an alkylaryl sulfonate or alkyl sulfate. Preferably, the emulsion polymerization medium also contains a chelating agent such as, for example, the tetrasodium salt of ethylenediaminetetraacetic acid so as to tie up any metal ions which could otherwise interfere with the polymerization or catalyze depolymerization of the product. It is also preferred that the pH of the polymerization medium be adjusted to within the range of about 8.5 to 9.5, for example, by addition of an alkali metal hydroxide and/or alkali metal bicarbonate. Water soluble initiators are also preferred in the preparation of the polymers of the invention. Thus, the reactor charge should also contain such as initiator, for example, potassium persulfate.

Preferably, prior to the introduction of monomers, the emulsion polymerization medium is heated to a temperature in the range of 75°–90° C., most preferably 80°–85° C., in a stirred vessel. A mixture of monomers is then continuously added to the reaction vessel at a controlled rate which is slow enough to avoid progressive accumulation of diester monomer and to obtain a polymer whose composition contains repeating units in substantially the same proportions as the monomers added to the system. Depending on the reactor system utilized, and more particularly the heat removal capacity, monomer introduction rate may also need to be limited to avoid any excessive temperature increase in the reaction medium due to the exothermic heat of reaction. The total amount of monomer added is preferably such as to provide a product latex containing 30–45%, most preferably 35–40% solids. Monomers can be added either individually or mixed, and in either bulk or emulsion form, but a bulk premixture is preferred.

Typically, the monomer mixture is introduced over a period of 1–2 hours. After monomer introduction is complete, the polymerization mixture is preferably heated to a temperature of 82°–90° C. and held at such temperature for an additional 20–60 minutes to complete the polymerization. Thereafter, the product latex is cooled to 25° C. and either air dried or spray dried to produce a fine powdery terpolymer.

In the preparation of a segmented polymer, a first monomer mixture is added in the proportions desired in the first polymer segment. This mixture is added slowly and continuously to produce a prepolymer corresponding to the first segment. Thereafter, a terminal monomer mixture is added containing monomers in the proportions desired for the terminal segment. The relative amounts of the two monomer mixtures are preferably such as to provide the 0.2–1.0 weight ratio of terminal segment to first segment, and the total amount of monomer is such as to provide the latex solids content adverted to above.

In a preferred alternative of the process of the invention, the nonionic surfactant is omitted and a fatty acid soap is used in place of a sulfate or sulfonate detergent as the anionic surfactant. Conveniently, a dispersion of the soap is produced in situ by independently adding a fatty acid and an alkali metal hydroxide to the polymerization medium. Where such a soap is substituted for the detergent, the solid particles of the latex product can be agglomerated and precipitated from the emulsion polymerization medium as granules. This is readily accomplished by mixing the product latex with a solution containing a coagulating electrolyte such as $MgSO_4$ or other divalent metal salt which forms insoluble soaps with the fatty acid component of the latex. Strong acids are also effective coagulants. The solid granular terpolymer product can be recovered by filtration and dried with considerably less expenditure of energy than is necessary for the recovery of fine particles from a latex. Also, the agglomerated particles can be washed, thereby eliminating contaminants which may otherwise cause color degradation of a polyvinyl halide composition in which the terpolymer is utilized. Moreover, the agglomerates represent a superior commercial form of the processing aid since they can be handled and packaged with much less dusting than is encountered with the fine particle powder.

In preparation of the processing aid in granular form, the proportion of soap is preferably adjusted to produce granules of 1/64" (0.4 mm) to 1/16" (1.6 mm), most preferably about 1/32" (0.8 mm), in size. Generally a soap content of 1 to 3% by weight, preferably about 2% by weight is suitable. The granules are constituted of primary particles whose size corresponds to that of the latex solids, i.e., 90% by weight less than about 100 microns. In mechanical processing of a polyvinyl halide polymer blend containing the processing aid, the granules are readily reduced to the constituent primary particles.

By dry blending a terpolymer of the invention with a polyvinyl halide polymer prior to mechanical processing, a composition is provided which not only has superior properties for processing but which yields a final product shaped article whose mechanical properties approximate the unplasticized polyvinyl halide. In the polyvinyl halide blends, the preferred proportion of processing aid varies according to the mechanical process to which the composition is to be subjected and the end product to be formed. Broadly, the proportion of PPA may vary from 0.1 to 20% by weight. In most applications, the polyvinyl halide composition should contain between about 1 and about 3% by weight of the terpolymer processing aid. For calendered sheet and extruded siding, the processing aid content is preferably in the range of 1.5–3%. However, in extruded pipe applications, a processing aid content as low as 0.1–0.5% may be suitable, while in some calendering operations, processing aid contents in the range of 3–8% or higher may be appropriate.

Other components of the polyvinyl halide blend composition include conventional heat stabilizers such as dibutyl tin laurate, basic lead carbonate, dibasic lead phthalate, fatty acid soaps of barium, cadmium and zinc, cadmium and barium phenates and epoxidized linseed and soybean oils. While the optimum proportion of the heat stabilizer may vary rather widely, for example 0.1–10% by weight, the requisite heat stabilizer level for a given application is significantly reduced by the effect of the terpolymer processing aid in promoting rapid low temperature fusion and low melt viscosity. This both lowers the temperatures to which the polyvinyl halide is exposed and the time over which the exposure occurs.

Of the heat stabilizing materials noted above, the fatty acid soaps such as calcium and zinc stearate also serve as lubricants in the polyvinyl halide blend composition. Other lubricants such as paraffin waxes and oxidized low molecular weight polyethylene can also be included. Typically, polyvinyl halide blend compositions further contain fillers, such as calcium carbonate, and pigments, such as titanium dioxide, all in essentially conventional proportions well known to the art.

In preparing the blends, the particulate polyvinyl halide resin and terpolymer processing aid are blended using conventional powder mixing equipment such as a Brabender, Hobart or Henschel mixer. In the preparation of a blend adapted for extrusion, the resin is preferably agitated by itself with an energy input sufficient to heat it to 125°–135° F. (52°–57° C.), at which temperature the stabilizer is added. Thereafter, mechanical mixing is carried out with sufficient energy input to raise the temperature to 160°–180° F. (71°–82° C.) at which point the processing aid is blended in. Where other components such as fillers, pigments, plasticizers, resin modifiers and impact modifiers are utilized, these are preferably incorporated subsequent to the addition of the processing aid, and at a temperature in the range of 170°–190° F. (76°–88° C.). Lubricants can thereafter be added at a temperature in the range of 190°–210° F. (88°–99° C.) and the blend brought up to 220°–240° F. (104°–116° C.) by further energy input. Preferably, the energy input arises from the frictional heat generated by mechanical mixing alone and no external heat is applied during the mixing.

Mechanical processing of the polyvinyl halide composition proceeds using conventional milling, calendering, injection molding blow molding, thermoforming and extrusion techniques and equipment. In the preparation of the final shaped article product, the polymer blend may be used directly as a powder. Alternatively, when the final product is manufactured by such processes as extrusion and injection molding, the blend may be preliminarily extruded and pelletized, and the pellets fed to the final forming process. Because of the effect of the processing aid on the kinetics of polyvinyl halide particle structure breakdown, as illustrated generally in FIG. 4, with resultant effect on the viscosity vs. temperature relationship as illustrated generally in FIG. 3, both preliminary and final processing can be carried out at temperatures that are controlled below 400° F. (204° C.). At any given temperature and after any particular period of mechanical working, percentage fusion, i.e., the proportion of the polyvinyl halide reduced to the microdomain structure, is substantially higher than that for the polymer without the processing aid. However, at a given viscosity, percentage fusion and associated die swell are lower than for PVCs containing PPAs based on methyl methacrylate. Because the processing aids provide rapid fusion and low melt viscosity, and allow use of relatively low processing temperatures, both high throughput and low energy consumption can be achieved through their use. Low melt viscosity also enhances mold definition and mold filling rates in injection molding processes and reduces mechanical wear on the screw used in injection molding and extrusion processing. Single screw rather than twin screw equipment is rendered feasible for many applications. It has further been observed that the PPAs promote mold release, and are relatively noncorrosive and do not cause pitting of the screen or other equipment surfaces. Moreover, it has been found that pigment dispersion is facilitated. Most significantly, the PPAs of the invention afford a high efficiency, relatively lower proportions generally being required for a given application as compared to those PPAs previously available commercially.

A variety of polyvinyl halide polymers may be used in blends containing the terpolymer processing aids of the invention. Particularly advantageous are blends containing vinyl chloride homopolymers since the homopolymers have favorable mechanical properties and the processing aids are capable of facilitating the processing of the homopolymers without materially diminishing those properties. However, the processing aids of the invention are also suited for use in processing copolymers comprised of vinyl chloride and a variety of comonomers, including vinyl acetate, vinylidene chloride, maleic anhydride and various acrylics. The processing aids are also useful in conjunction with chlorinated polyvinyl chloride and blends of chlorinated polyethylene and polyvinyl chloride, as well as carboxylated PVC latexes and blends of polyvinyl chloride with butadiene/acrylonitrile rubbers.

In accordance with the invention, a wide variety of shaped articles can be produced by various conventional processes such as milling, calendering, extrusion, injection molding, blow molding, thermoforming and the like. These products have advantageous mechanical properties which approximate those of the unplasticized polyvinyl halide resin constituent of the blend from which the product article is made. Of major significance is the capability of the PPAs to significantly reduce fusion time, fusion temperature and melt viscosity, without substantial adverse effect on the heat deflection temperature or other service properties of a processed PVC blend containing the PPAs. In particular, surface quality is high and, when desired, clarity is preserved. Also, the weatherability of the shaped articles has been found superior to that of comparable articles produced form blends containing commercially available PPAs.

The following examples illustrate the invention.

EXAMPLE 1

An emulsion polymerization medium was prepared by charging the following components to a stirred reactor vessel:

| Reactor Charge | Parts by Weight |
| --- | --- |
| Deionized Water | 177 |
| Tetrasodium Salt of Ethylene-diaminetetraacetic acid | 0.05 |
| Sodium Dodecylbenzenesulfonate | 2.0 |
| Nonylphenoxypolyethyleneoxyethanol | 1.5 |
| Sodium Bicarbonate | 0.4 |
| Sodium Hydroxide | 0.5 |
| Potassium Persulfate | 0.25 |

A bulk monomer mixture was prepared containing 97 parts by weight styrene and 3 parts by weight methacrylic acid. The emulsion polymerization medium was heated to 80° C. and introduction of the monomer mixture into the medium was commenced. The monomer mixture was added slowly and continuously over a period of 80 minutes. After introduction of the monomer mixture was complete, the reaction system was heated to 85° C., maintained at that temperature for an additional 30 minutes, and then cooled to 25° C. A finished latex was obtained which contained 37% by weight solids and had a pH of 9.4. It was air dried and mechanically agitated to produce a fine white powdery polymer having a particle size distribution such that 90% by weight was finer than 100 microns.

Using the same emulsion polymerization medium, a series of random terpolymers was produced using the bulk monomer mixtures set forth in Table 1. In each case, a latex was obtained having a pH of 9.0-9.5 and containing 35-40% by weight solids. Upon air drying, a white powdery polymer was obtained having the fine particle size distribution stated above.

In the tables, the following abbreviations are used for the various monomers:

Olefins

STY = Styrene

Diesters of Addition Polymerizable Dicarboxylic Acid

DEF = diethyl fumarate
DEM = diethyl maleate
DBM = dibutyl maleate
DBF = dibutyl fumarate
DBI = dibutyl itaconate
DMI = dimethyl itaconate
BBM = butyl benzyl maleate

Solubilizing Monomers

AN = acrylonitrile
MMA = methyl methacrylate
EA = ethyl acrylate
BA = butyl acrylate
HEA = hydroxyethyl acrylate
VA = vinyl acetate
MA = methyl acrylate
MAn = maleic anhydride
MCA = methyl Cellosolve acrylate (ethylene glycol monomethyl ether acrylate)

Other Monomers

MEM = monomethyl maleate
MBM = monobutyl maleate

TABLE 1

| Compositions of Random Terpolymers Produced in Non-Soap Emulsions | | | |
|---|---|---|---|
| | Parts by weight monomer | | |
| Polymer | Olefin | Diester | Solubilizing |
| 29 | 40 STY | 10 DEF | 10 AN |
|  |  |  | 40 MMA |
| 30 | 40 STY | 20 DEF | 10 AN |
|  |  |  | 30 MMA |
| 31 | 75 STY | 10 DEF | 15 AN |
| 32 | 75 STY | 10 DEM | 15 AN |
| 33 | 55 STY | 20 DEM | 20 AN |
|  |  |  | 5 MCA |
| 34 | 60 STY | 20 DEM | 20 AN |
| 40 | 40 STY | 20 DBF | 40 MMA |
| 41 | 40 STY | 20 DBM | 40 MMA |
| 42 | 40 STY | 20 DEM | 40 MMA |
| 43 | 40 STY | 20 DEM | 40 MMA |
| 44 | 40 STY | 20 DEF | 40 MMA |

EXAMPLE 2

Using the emulsification medium described in Example 1, segmented polymers were prepared by the following procedure. The polymerization medium was preheated to 80° C., after which a first bulk monomer mixture was slowly and continuously added to the medium over a period of approximately 80 minutes. Immediately after completing introduction of the first monomer mixture, a second bulk monomer mixture was continuously added to the reaction medium over a period of about 20 minutes, while the reaction temperature was maintained at approximately 80° C. When introduction of the second monomer mixture was complete, the reaction mixture was heated to 85° C. and maintained at that temperature for an additional 30 minutes. Upon cooling to 25° C., a latex product was obtained containing 35-40% solids and having a pH of 9.0-9.5. In each instance, the polymer recovered from the latex by air-drying and mechanical agitation was a fine white powder having a particle size distribution such that 90% by weight was less than about 100 microns in size.

Compositions of the monomer mixtures for the segmented polymers of this example are set forth in Table 2.

TABLE 2

| Compositions of Segmented Terpolymers Produced in Non-Soap Emulsions | | | | |
|---|---|---|---|---|
| | Monomer | Parts by Weight Monomer | | |
| Polymer | Mixture | Olefin | Diester | Solubilizing |
| 54 | I | 37 STY | 25 DEF | 10 AN |
|  | II | 28 STY |  |  |
| 57 | I | 10 STY | 15 DEF | 5 AN |
|  | II | 60 STY |  | 10 AN |
| 59 | I | 15 STY | 20 DEF | 5 AN |
|  | II | 55 STY |  | 5 AN |
| 61 | I | 50 STY | 15 DEF | 15 AN |
|  | II | 15 STY |  | 5 AN |
| 62[a] | I | 50 STY | 15 DEF | 15 AN |
|  | II | 15 STY |  | 5 AN |
| 63 | I | 50 STY | 15 DEF | 15 AN |
|  | II | 15 STY |  | 5 AN |
| 64 | I | 50 STY | 15 DEF | 15 AN |
|  | II | 15 STY |  | 5 AN |
| 66 | I | 50 STY | 15 DMI | 15 AN |
|  | II | 15 STY |  | 5 AN |
| 67 | I | 50 STY | 15 BBM | 15 AN |
|  | II | 15 STY |  | 5 AN |
| 69 | I | 60 STY | 10 DBF | 10 AN |
|  | II | 15 STY |  | 5 AN |
| 73 | I | 60 STY | 10 DBF | 10 AN |
|  | II | 15 STY |  | 5 AN |
| 77-87 | I | 60 STY | 10 DBF | 10 AN |
|  | II | 15 STY |  | 5 AN |
| 89 | I | 60 STY | 10 DBF | 10 MMA |
|  | II | 15 STY |  | 5 MMA |
| 91, 92, 94 | I | 60 STY | 10 DBF | 10 AN |
|  | II | 15 STY |  | 5 AN |
| 101[b, e] | I | 60 STY | 10 DBF | 10 AN |
|  | II | 15 STY |  | 5 AN |
| 102 | I | 60 STY | 10 DBF | 10 AN |
|  | II | 15 STY |  | 5 AN |
| 103[c, f] | I | 59 STY | 10 DBF | 15 AN |
|  | II | 15 STY |  | 5 AN |
| 104[c] | I | 60 STY | 10 DBF | 10 AN |
|  | II | 15 STY |  | 5 AN |
| 105[b] | I | 53 STY | 17 DBF | 10 AN |
|  | II | 15 STY |  | 5 AN |
| 106 | I | 53 STY | 17 DEF | 10 AN |
|  | II | 15 STY |  | 5 AN |
| 107[d] | I | 65 STY | 10 DBF | 5 AN |
|  | II | 10 STY |  | 10 AN |
| 108 | I | 55 STY | 15 DBF | 10 AN |
|  | II | 15 STY |  | 5 AN |

[a] No NaOH in formulation
[b] 0.16% potassium persulfate
[c] 0.1% potassium persulfate≠[d]0.14% potassium persulfate
[e] 0.75% fumaric acid
[f] 1% methacrylic acid

EXAMPLE 3

An emulsion polymerization medium having the following composition was prepared in a stirred reactor vessel:

| Reactor Charge | Parts |
|---|---|
| Deionized Water | 178 |
| Tetrasodium Salt of Ethylene Diaminetetraacetic acid | 0.05 |
| C16-C18 Fatty Acid | 3.5 |
| Sodium Bicarbonate | 0.4 |
| Sodium Hydroxide | 0.8 |
| Potassium Persulfate | 0.1 |

Using this polymerization medium, both segmented and random terpolymer latexes were prepared from bulk monomer mixtures, essentially in the manner described in Examples 1 and 2. In each case, a latex was formed having a pH of about 9.5 and a solids content of about 37% by weight.

A 3% by weight MgSO4 solution was prepared having a volume approximately twice that of the product latex. This solution was heated to 85°–90° C. and the latex slowly added thereto over a period of 20–30 minutes. This caused the latex to coagulate, producing granules of the terpolymer that precipitated from the emulsion. The coagulated mixture was then filtered for recovery of the granular product and the polymer washed on the filter with a volume of hot water essentially equivalent to the volume of MgSO4 solution used for coagulation. After drying in a vacuum oven, the white granular polymer was found to have an average particle size of approximately 1/32 of an inch (0.8 mm). This granular product could be handled with minimal dusting but was readily reducible to its constituent particles upon grinding or subjection to mechanical processing in PVC blends.

Set forth in Table 3 are the compositions of the monomer mixtures used in the preparation of the granular polymers of this example.

TABLE 3

Compositions of Terpolymers Produced In Fatty Acid Soap Emulsions

| Polymer | Monomer Mixture | Parts by Weight Monomer | | |
|---|---|---|---|---|
| | | Olefin | Diester | Solubilizing |
| 91A | I | 60 STY | 10 DBF | 10 AN |
| | II | 15 STY | | 5 AN |
| 91B | I | 60 STY | 10 DBF | 10 AN |
| | II | 15 STY | | 5 AN |
| 92A | I | 60 STY | 10 DBF | 10 AN |
| | II | 15 STY | | 5 AN |
| 92B | I | 60 STY | 10 DBF | 10 AN |
| | II | 15 STY | | 5 AN |
| 93 | I | 60 STY | 10 DBF | 10 AN |
| | II | 15 STY | | 5 AN |
| 95 | I | 60 STY | 10 DBF | 10 AN |
| | II | 15 STY | | 5 AN |
| 96[a] | I | 60 STY | 10 DBF | 10 AN |
| | II | 15 STY | | 5 AN |
| 97[b] | I | 60 STY | 10 DBF | 10 AN |
| | II | 15 STY | | 5 AN |
| 98 | I | 60 STY | 10 DBF | 10 AN |
| | | | | 5 AN |
| 99 | I | 60 STY | 10 DBF | 10 AN |
| | II | 15 STY | | 5 AN |
| 110[c] | I | 55 STY | 10 DBF | 15 AN |
| | II | 15 STY | | 5 AN |
| 112 | I | 50 STY | 15 DBF | 15 AN |
| | II | 15 STY | | 5 AN |
| 114 | I | 46 STY | 17 DBF | 12 AN |
| | II | 20 STY | | 5 AN |
| 115 | I | 46 STY | 17 BDI | 12 AN |
| | II | 20 STY | | 5 AN |
| 116 | (Random) | 66 STY | 17 DBF | 17 AN |
| 117 | (Random) | 66 STY | 17 DBI | 17 AN |

[a] also 0.25 phr fumaric acid
[b] also 0.25 phr itaconic acid
[c] 0.14% potassium persulfate Weight average molecular weights and glass transition temperatures were measured for the terpolymers of Examples 1 to 3. Molecular weight was determined by gel permeation chromatography and glass transition temprature was determined by ASTM D3418 (1982). The degree of compatibility between the terpolymer processing aids and PVC was assessed by taking transmission electron micrographs of injection molded PVC formulations produced in accordance with Example 4, infra.

TABLE 4

| Polymer No. | M.W. | Glass Transition Temperature °C. | Avg. Particle Size (TEM) |
|---|---|---|---|
| 29 | 128K | 92 | — |
| 30 | 130 | 88 | — |
| 31 | 446 | 92 | <½μ |
| | 573 | 92 | |
| 32 | 587 | 82 | <½μ |
| 33 | 399 | 51 | <¼μ |
| 34 | 570 | 63 | <¼μ |
| 40 | 367 | 78 | — |
| 41 | 397 | 35 | — |
| 42 | 377 | 43 | — |
| 44 | 306 | 102 | — |
| 57 | 700 | 95 | — |
| 59 | 654 | 100 | — |
| 61 | 577 | 98 | — |
| 62 | 470 | 99 | — |
| 63 | 644 | 73 | — |
| 64 | 549 | 102 | — |
| 66 | 269 | 105 | <½μ |
| 67 | 655 | 65 | <1/5μ |
| 69 | 599 | 95 | <½μ |
| 73 | 848 | 90 | <½μ |
| 74 | 763 | 85 | <½μ |
| 75 | 780 | 85 | <½μ |
| 76 | 657 | 83 | <½μ |
| 88 | 262 | 97 | — |
| 89 | 322 | 84 | <2½μ |
| 90 | 364 | 89 | — |
| 91A | 199 | 94 | <½μ |
| 91B | — | 94 | <½μ |
| 92A | 197 | 95 | <¼μ |
| 92B | — | 95 | <½μ |
| 93 | 370 | 92 | — |
| 95 | 458 | 91 | <½μ |
| 96 | 492 | 91 | — |
| 97 | 456 | 90 | — |
| 98, 99 | 449 | 88 | — |
| 101 | 813 | 87 | — |
| 102 | 794 | 87 | — |
| 103 | 809 | 87 | — |
| | 813 | | |
| 104 | 1215 | 90 | — |
| 105 | 543 | 85 | — |
| 106 | 480 | 97 | — |
| 107 | 835 | 90 | — |
| | 832 | | |
| 108 | 1150 | 83 | — |
| 110 | 1170 | 94 | — |
| 112 | 1490 | 89 | — |

EXAMPLE 4

Using blends of PVC homopolymer containing the polymer processing aids produced in Examples 1–3, fusion tests were carried out using a Brabender plasticorder. Formulations for use in these tests were prepared by hand mixing batches 50 grams in size. Each batch contained a polyvinyl chloride resin having an average inherent viscosity of 0.92, a molecular weight of 82,500 and a glass transition temperature of 77° C., as sold under the trade designation Geon 103 EPF-76 by B. F. Goodrich Company (100 parts by weight), dibutyl tin bis(isooctyl mercaptoacetate) sold under the trade designation Thermolite 31 by M. and T. Chemical (2 parts by weight), titanium dioxide pigment sold under the trade designation Rutile R-901 by DuPont (2 parts by weight), and the terpolymer processing aid. In most instances, the PPA content was 4 phr but, in the case of certain of the terpolymers, lower levels of 1-3.5 phr were also tested.

In each test in the Brabender plasticorder, the rotor speed was 120 RPM and the fusion head temperature was 201° C. Measurements were made of fusion time, fusion temperature, torque at fusion, and stability time (i.e., time between fusion and degradation). The temperature and torque at degradation were also determined. Results of these tests are set forth in Table 5.

Using certain of the PPAs of Examples 1 to 3, injection molding blends were prepared having the following composition.

PVC suspension resin (avg i.v.=0.68; Tg=75° C.; $M_w$=57,600) Sold under the trade designation Geon 110×334 by B. F. Goodrich: 100 phr
Thermolite 31: 3 phr
Processing aid: 4 phr The ingredients of these blends (~600 g. each) were mixed for 5 minutes in a Hobart laboratory low-speed mixer, then melt mixed by extrusion at 180°-190° C. and pelletized. The extruder was a ¾" (19.1 mm) C. W. Brabender with a 2 to 1 compression ratio (L/D=20:1) and a 3/16" (4.76 mm) I.D. orifice die. From the pelletized blend, injection molded specimens were prepared and tested for various properties. Heat deflection temperature was determined by ASTM method D-648-72 using an injection molded sample 5"×½"×⅛" (12.7 cm×1.27 cm×0.32 cm); impact strength was determined in accordance with Method A of ASTM D-256-78 using a 4 ft.-lb. (0.554 Kg/m) scale and injection molded test specimens having a width of ½" (1.27 cm), a thickness of ⅛" (0.32 cm) and a 0.040" (0.102 cm) notch radius; tensile strength was determined on type I injection molded specimens in accordance with ASTM method D-638-77A using a Instron Tensometer at a testing speed of 0.2 inch/minute (0.508 cm/min) and a gauge length of 4.5" (11.43 cm).

For comparative purposes fusion tests were run on control samples (no PPA), and on PVC blends containing polystyrene, a commercially available poly(α-methylstyrene) processing aid, a commercially available processing aid based on methyl methacrylate, and several other copolymers of methyl methacrylate, and of styrene. For certain of these comparative processing aids, heat deflection, temperature, impact strength and tensile strength were also determined on standard injection molded specimens. Except for the processing aid, the compositions of the comparative fusion blends and injection molding blends were the same, respectively, as the above described fusion and injection molding blends containing the PPAs of the invention. Results of these tests are set forth in Table 6.

TABLE 5

| Polymer No. | PPA phr | Chamber Temp °C. | Fusion - 201° C. Head | | | Degradation | | |
|---|---|---|---|---|---|---|---|---|
| | | | Temp. °C. | Torque g-m | Fusion Time | Temp. °C. | Torque g-m | Stability Time |
| Control | 0 | 183 | 213 | 3420 | 9'30" | 243 | 1790 | 2'25" |
| 29 | 4 | 183 | 190 | 5100 | 0'10" | 240 | 1950 | 2'35" |
| 30 | 4 | 183 | 183 | 5500 | 0'10" | 240 | 1910 | 2'50" |
| 31 | 4 | 184 | 189 | 5150 | 0'10" | 241 | 1970 | 2'50" |
| 31 | 2.5 | 184 | 193 | 5050 | 0'20" | 244 | 1950 | 2'55" |
| 31 | 2.0 | 183 | 193 | 4850 | 0'25" | 244 | 1920 | 3'00" |
| 31 | 1.5 | 183 | 193 | 4550 | 0'30" | 243 | 1920 | 2'50" |
| 31 | 1.0 | 182 | 210 | 3600 | 7'55" | 244 | 1830 | 2'30" |
| 32 | 4 | 183 | 191 | 5300 | 0'20" | 244 | 1990 | 2'45" |
| 33 | 4 | 183 | 191 | 5200 | 0'10" | 244 | 1990 | 2'55" |
| 34 | 4 | 185 | 191 | >5000 | 0'20" | 245 | 2000 | 2'40" |
| 40 | 4 | 182 | 186 | 5000 | 0'15" | 238 | 1820 | 3'10" |
| 41 | 4 | 182 | 192 | 4400 | 0'20" | 238 | 1830 | 3'00" |
| 42 | 4 | 182 | 190 | 4750 | 0'20" | 238 | 1870 | 2'55" |
| 44 | 4 | 182 | 189 | 5050 | 0'20" | 238 | 1880 | 3'00" |
| 57 | 4 | 182 | 190 | 5650 | 0'20" | 245 | 1990 | 2'40" |
| 59 | 4 | 183 | 183 | 5500 | 0'15" | 244 | 1970 | 2'50" |
| 61 | 4 | 182 | 187 | 5700 | 0'20" | 245 | 2030 | 2'40" |
| 62 | 4 | 181 | 187 | 5700 | 0'20" | 244 | 2020 | 2'45" |
| 63 | 4 | 181 | 187 | 5800 | 0'20" | 244 | 2010 | 2'45" |
| 64 | 4 | 181 | 188 | 5650 | 0'20" | 245 | 2000 | 2'45" |
| 66 | 4 | 181 | 190 | 5400 | 0'20" | 244 | 2020 | 2'40" |
| 67 | 4 | 185 | 185 | >6000 | 0'10" | 244 | 2030 | 2'45" |
| 69 | 4 | 182 | 183 | >6000 | 0'10" | 244 | 1990 | 2'50" |
| 69 | 2 | 182 | 187 | >5000 | 0'20" | 243 | 1940 | 2'55" |
| 69 | 1.5 | 183 | 192 | 4800 | 0'25" | 244 | 1930 | 2'50" |
| 69 | 1.0 | 182 | 210 | 3600 | 7'35" | 244 | 1830 | 2'30" |
| 73 | 4 | 184 | 181 | 6050 | 0'05" | 246 | 2060 | 2'50" |
| 74 | 4 | 183 | 183 | 5900 | 0'05" | 245 | 2050 | 2'45" |
| 75 | 4 | 183 | 184 | 5800 | 0'05" | 245 | 2020 | 2'50" |
| 76 | 4 | 183 | 181 | 6000 | 0'05" | 245 | 2050 | 2'45" |
| 88 | 4 | 183 | 190 | 5430 | 0'05" | 245 | 2020 | 2'45" |
| 89 | 4 | 184 | 194 | 4420 | 0'10" | 242 | 1860 | 3'05" |
| 90 | 4 | 182 | 180 | 5900 | 0'01" | 244 | 1990 | 3'00" |
| 91A | 4 | 182 | 192 | 5700 | 0'05" | 245 | 1890 | 3'20" |
| 91B | 4 | 184 | 191 | 5300 | 0'10" | 244 | 1890 | 3'10" |
| 92A | 4 | 183 | 190 | 5100 | 0'05" | 245 | 1900 | 3'15" |

TABLE 5-continued

| | | | Fusion - 201° C. Head | | | Degradation | | |
|---|---|---|---|---|---|---|---|---|
| Polymer No. | PPA phr | Chamber Temp °C. | Temp. °C. | Torque g-m | Fusion Time | Temp. °C. | Torque g-m | Stability Time |
| 92B | 4 | 183 | 190 | 5300 | 0'05" | 243 | 1890 | 3'05" |
| 65 (70 STY/ 30 AN) | 4 | 181 | 195 | 4950 | 0'20" | 244 | 2030 | 2'35" |
| 65 (70 STY/ 30 AN) | 3 | 182 | 200 | 4500 | 1'00" | 244 | 2010 | 2'25" |
| 65 (70 STY/ 30 AN) | 2 | 181 | 213 | 3750 | 6'40" | 244 | 1910 | 2'20" |
| 65 (70 STY/ 30 AN) | 1 | 182 | 213 | 3600 | 8'50" | 244 | 1910 | 2'05" |
| RL-34 (70 STY/ 30 AN) | 4 | 185 | 190 | >5000 | 0'25" | 243 | 1880 | 2'55" |
| 53 (75 STY/ 25 DEF) | 4 | 183 | 192 | 4800 | 0'10" | 242 | 1800 | 3'25" |
| 53 (75 STY/ 25 DEF) | 2 | 182 | 197 | 4400 | 0'25" | 243 | 1850 | 3'00" |
| 53 (75 STY/ 25 DEF) | 1 | 182 | 213 | 3300 | 10'00" | 243 | 1810 | 2'20" |
| 46 (75 STY/ 25 DEF) | 4 | 183 | 190 | 4150 | 0'20" | 238 | 1690 | 3'25" |
| K-120 N (95 MMA/ 5 EA) | 4 | 181 | 209 | 4050 | 4'50" | 245 | 2010 | 2'10" |
| K-120 N (95 MMA/ 5 EA) | 3 | 183 | 211 | 3850 | 6'10" | 244 | 1920 | 2'10" |
| K-120 N (95 MMA/ 5 EA) | 2 | 183 | 212 | 3750 | 7'25" | 244 | 1890 | 2'15" |
| K-120 N (95 MMA/ 5 EA) | 1 | 182 | 213 | 3650 | 8'00" | 243 | 1910 | 2'05" |
| Amoco 18-210 | 4 | 182 | 192 | 4300 | 0'10" | 238 | 1720 | 3'40" |
| Polytyrene | 4 | 181 | 195 | 4000 | 0'10" | 240 | 1880 | 3'15" |
| Lytron 621-10 (8 STY/10 EA/ 10 AA) | 4 | 183 | 194 | 4260 | 0'20" | 242 | 1710 | 3'30" |
| 93 | 4 | 183 | 190 | 5230 | 0'05" | 243 | 1870 | 2'55" |
| 95 | 4 | 182 | 192 | 5200 | 0'10" | 244 | 1830 | 3'00" |
| 96 | 4 | 184 | 191 | 5250 | 0'05" | 244 | 1830 | 3'05" |
| 97 | 4 | 183 | 191 | 5100 | 0'10" | 243 | 1880 | 3'00" |
| 99 | 4 | 183 | 189 | 5250 | 0'10" | 243 | 1850 | 3'05" |
| 99 | 1.5 | 184 | 198 | 4350 | 0'35" | 243 | 1830 | 3'15" |
| 99 | 1.0 | 184 | 209 | 3560 | 6'15" | 243 | 1790 | 2'45" |
| 101 | 4 | 183 | 192 | 5100 | 0'10" | 244 | 1890 | 3'05" |
| 102 | 4 | 183 | 190 | 5080 | 0'10" | 245 | 1900 | 3'05" |
| 102 | 1.5 | 183 | 194 | 4610 | 0'20" | 243 | 1870 | 3'10" |
| 102 | 1.0 | 182 | 209 | 3620 | 6'50" | 243 | 1790 | 2'35" |
| 103 | 4 | 184 | 195 | 4850 | 0'10" | 245 | 1880 | 3'00" |
| 104 | 4 | 183 | 187 | 5280 | 0'10" | 245 | 1890 | 3'05" |
| 104 | 1.5 | 184 | 196 | 4500 | 0'25" | 243 | 1860 | 3'05" |
| 104 | 1.0 | 182 | 209 | 3660 | 6'05" | 243 | 1810 | 2'30" |
| 105 | 4 | 183 | 192 | 5140 | 0'05" | 244 | 1880 | 3'05" |
| 105 | 1.5 | 182 | 194 | 4750 | 0'10" | 243 | 1870 | 3'15" |
| 105 | 1.0 | 183 | 197 | 4300 | 0'30" | 243 | 1810 | 3'10" |
| 106 | 4 | 183 | 190 | 5300 | 0'05" | 244 | 1840 | 3'10" |
| 106 | 1.5 | 182 | 202 | 4000 | 1'50" | 243 | 1810 | 3'00" |
| 106 | 1.0 | 183 | 209 | 3610 | 6'45" | 243 | 1800 | 2'45" |
| 107 | 4 | 182 | 192 | 4940 | 0'10" | 244 | 1870 | 3'10" |
| 107 | 1.5 | 183 | 197 | 4450 | 0'20" | 243 | 1830 | 3'05" |
| 107 | 1.0 | 183 | 213 | 3460 | 10'30" | 244 | 1780 | 2'35" |
| 108 | 4 | 181 | 188 | 5190 | 0'10" | 244 | 1880 | 3'10" |
| 108 | 1.5 | 182 | 195 | 4700 | 0'25" | 243 | 1820 | 3'10" |
| 108 | 1.0 | 183 | 198 | 4300 | 0'30" | 243 | 1830 | 3'05" |
| 110 | 4 | 183 | 188 | 5500 | 0'10" | 245 | 1910 | 3'05" |
| 110 | 1.5 | 182 | 198 | 4250 | 0'45" | 243 | 1830 | 3'00" |
| 110 | 1.0 | 182 | 209 | 3700 | 5'40" | 243 | 1800 | 2'40" |
| 112 | 4 | 183 | 192 | 5300 | 0'10" | 245 | 1920 | 3'00" |
| 112 | 1.5 | 182 | 198 | 4250 | 0'45" | 243 | 1830 | 3'00" |
| 112 | 1.0 | 182 | 211 | 3660 | 6'50" | 243 | 1810 | 2'35" |

TABLE 5-continued

| Polymer No. | PPA phr | Chamber Temp. °C. | Fusion - 201° C. Head | | | Degradation | | |
|---|---|---|---|---|---|---|---|---|
| | | | Temp. °C. | Torque g-m | Fusion Time | Temp. °C. | Torque g-m | Stability Time |
| 114 | 4 | 183 | 190 | 5580 | 0'10" | 245 | 1890 | 3'00" |
| 114 | 1.5 | 181 | 195 | 4950 | 0'15" | 244 | 1880 | 3'15" |
| 114 | 1.0 | 182 | 196 | 4510 | 0'30" | 244 | 1840 | 3'00" |
| 115 | 4 | 183 | 188 | 5500 | 0'10" | 246 | 1910 | 3'05" |
| 115 | 1.5 | 183 | 194 | 4900 | 0'20" | 245 | 1890 | 2'55" |
| 115 | 1.0 | 183 | 212 | 3670 | 8'15" | 244 | 1790 | 2'25" |
| 116 | 4 | 182 | 190 | 5450 | 0'05" | 245 | 1890 | 3'05" |
| 116 | 1.5 | 183 | 193 | 5120 | 0'10" | 244 | 1890 | 3'10" |
| 116 | 1.0 | 182 | 198 | 4450 | 0'30" | 244 | 1820 | 3'10" |
| 117 | 4 | 182 | 188 | 5400 | 0'05" | 245 | 1890 | 3'05" |
| 117 | 1.5 | 184 | 193 | 4850 | 0'10" | 244 | 1870 | 3'00" |
| 117 | 1.0 | 183 | 200 | 4350 | 0'35" | 244 | 1840 | 3'05" |

TABLE 6

| Polymer No. | HDT °C. | Izod Impact ft. lb./in. (kg-m/cm) | Tensile Strength psi (kg/cm²) | Clarity |
|---|---|---|---|---|
| Control | 63.2 | 3.2 (0.18) | 7700 (541) | Clear |
| 31 | 64.0 | 2.2 (0.12) | 8000 (562) | Hazy |
| 32 | 64.9 | 1.7 (0.09) | 8500 (598) | Hazy |
| 32 | 64.9 | 1.7 (0.09) | 8500 (598) | Hazy |
| 34 | 64.0 | 2.1 (0.12) | 8800 (598) | Clear |
| 40 | — | — | — | Sl. Hazy |
| 41 | — | — | — | Sl. Hazy |
| 42 | — | — | — | Sl. Hazy |
| 44 | — | — | — | Sl. Hazy |
| 57 | 64.2 | 2.4 (0.13) | 7900 (555) | Sl. Hazy |
| 59 | 63.8 | 2.9 (0.16) | 7900 (555) | Sl. Hazy |
| 61 | 64.1 | 1.4 (0.08) | 8000 (562) | Clear |
| 62 | 63.1 | 2.9 (0.16) | 7700 (541) | Sl. Hazy |
| 63 | 62.3 | 2.5 (0.14) | 8200 (576) | Hazy-Opaque |
| 64 | 63.0 | 2.7 (0.15) | 7700 (541) | Clear |
| 66 | 63.4 | 2.8 (0.16) | 8000 (562) | Clear |
| 67 | 64.8 | 2.3 (0.13) | 8500 (598) | Clear |
| 69 | 63.7 | 3.1 (0.17) | 7800 (548) | Sl. Hazy |
| 73 | 64.4 | 2.6 (0.14) | 8100 (569) | Hazy |
| 74 | 64.5 | 2.4 (0.13) | 8300 (583) | Hazy |
| 75 | 65.0 | 2.4 (0.13) | 8200 (576) | Sl. Hazy |
| 76 | 65.5 | 2.7 (0.15) | 8300 (583) | Sl. Hazy |
| 88 | 65.4 | 2.2 (0.12) | 8200 (576) | Hazy |
| 89 | 65.5 | 2.4 (0.13) | 8100 (569) | Opaque |
| 90 | 65.2 | 2.5 (0.14) | 8000 (562) | Hazy |
| 91A | 64.8 | 2.7 (0.15) | 8100 (569) | Sl. Hazy |
| 91B | 64.8 | 2.6 (0.14) | 8100 (569) | Sl. Hazy |
| 92A | 64.7 | 2.1 (0.12) | 8100 (569) | Clear |
| 92B | 64.7 | 2.4 (0.13) | 8000 (562) | Clear |
| 65 (70 STY/30 AN) | 63.4 | 2.9 (0.16) | 7800 (548) | Hazy-Opaque |
| RL-34 (80 STY/30 AN) | 65.2 | 2.6 (0.14) | 8300 (583) | Clear |
| 53 | 62.8 | 2.5 (0.14) | 8100 (569) | Hazy-Opaque |
| 46 | 62.0 | 2.1 (0.12) | 7900 (555) | Hazy |
| K-120 N (95 MMA/SEA) | 64.4 | 2.7 (0.15) | 8100 (569) | Clear |
| Amoco 18210 | 62.3 | 1.6 (0.08) | 8600 (605) | Hazy-Opaque |
| Polystyrene | 64.0 | 3.4 (0.19) | 7600 (534) | Opaque |
| (80 STY/10 EA/10 AA) | — | — | — | Hazy-Opaque |
| 93 | 65.4 | 2.5 (0.14) | 8200 (576) | Hazy |
| 95 | 65.2 | 2.6 (0.14) | 8300 (583) | Hazy |
| 101 | 63.3 | 3.2 (0.18) | 7800 (548) | Hazy |
| 102 | 63.4 | 3.2 (0.18) | 7800 (548) | Hazy |
| 103 | 63.8 | 2.2 (0.12) | 7900 (555) | Hazy-Opaque |
| 104 | 64.2 | 2.4 (0.13) | 7900 (555) | Hazy |
| 105 | 63.8 | 3.2 (0.18) | 7800 (548) | Clear |
| 106 | 63.9 | 3.1 (0.17) | 7800 (548) | Sl. Hazy |
| 107 | — | — | — | Hazy |
| 108 | — | — | — | Sl. Hazy |
| 110 | — | — | — | Clear |
| 112 | — | — | — | Clear |
| 114 | — | — | — | Clear |
| 115 | — | — | — | Clear |
| 116 | — | — | — | Sl. Hazy |
| 117 | — | — | — | Sl. Hazy |

Certain of the injection molded samples were also observed for clarity. The samples containing polystyrene as a processing aid were opaque. Those containing Amoco 18-210 and the 80STY/10EA/10AA PPAs were hazy. Slightly hazy specimens were obtained with polymer 31, polymer 46 and polymer 69. The control sample and the sample containing polymer 114 and K-120N were clear.

To illustrate the impact of processing aid level on fusion time and temperature a plot of these parameters verus PPA level for blends containing polymer 69, 114 and the commercially available K-120N are set forth in FIGS. 5 and 6 respectively.

EXAMPLE 5

Figure 7:
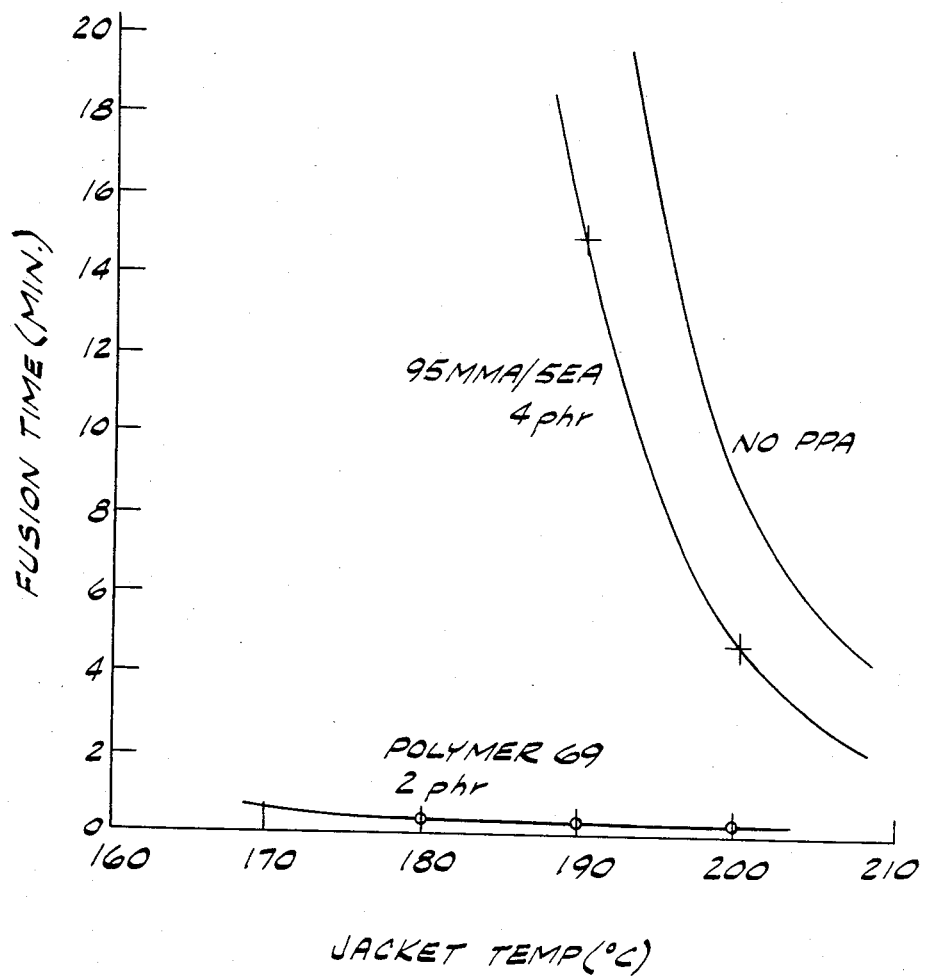
FIG. 7 sets forth plots of fusion time vs. head temperature for Brabender fusion tests on the blends of FIGS. 5 and 6.

Utilizing PVC blends containing polymer 69 (2 phr) and otherwise corresponding to those used in fusion tests of Example 4, fusion time was measured at a series of fusion head temperatures, i.e., 180° C., 190° C. and 200° C. This data is plotted in FIG. 7 together with comparable data for K-120N at 4 phr, and a control (no PPA).

EXAMPLE 6

Killion extrusion tests were run on PVC blends of the same type utilized in the fusion tests of Example 4. Each of the extrusion blends contained 4 phr of the processing aid. For comparative purposes, similar extrusion tests were run using controls (no PPA) and blends containing polystyrene and various of the other alternative processing aids mentioned in Example 4. In each extrusion run, stock temperature, and die backpressure were measured. In certain of the runs, the measurements were also made of drive power, output, energy consumption, die swell and surface quality. Surface quality was judged on an arbitrary scale of 1 to 11, with 1 designating the best surface and 11 the worst. Results of the extrusion runs of this example are set forth in Table 7.

TABLE 7

| Polymer No. | Stock Temp. °C. | Back Pressure psi (kg/cm²) | Drive Power watts | Output g/min | Energy Consumption w-min/g | Post Extrudate Swell* mil | Post Extrudate Swell* % |
|---|---|---|---|---|---|---|---|
| Control | 185 | 2115 (148.6) | 1573 | 148.4 | 10.6 | 171 | 36.8 |
| A1 | 183 | 2108 (148.2) | 1624 | 141.2 | 11.5 | — | — |
| A2 | 184 | 2172 (152.7) | 1485 | 135.0 | 11.0 | — | — |
| A3 | 185 | 2177 (153.0) | 1468 | 148.3 | 9.9 | 180 | 44.0 |
| A4 | 184 | 2097 (147.4) | 1436 | 145.1 | 9.0 | 182 | 45.6 |
| A5 | 185 | 2097 (147.4) | 1353 | 140.9 | 9.6 | 184 | 47.2 |
| A6 | 186 | 2258 (158.7) | 1499 | 141.4 | 10.6 | 181 | 44.8 |
| A7 | 186 | 2258 (158.7) | 1469 | 1399 | 10.5 | 188 | 50.4 |
| A8 | 183 | 1944 (136.7) | 1459 | 136.4 | 10.7 | — | — |
| 2 | 183 | 2116 (148.8) | 1437 | 138.2 | 10.4 | — | — |
| 3 | 182 | 1855 (130.4) | 1348 | 136.2 | 9.9 | — | — |
| 6 | 185 | 1971 (138.6) | 1477 | 136.8 | 10.8 | — | — |
| 31 | 186 | 2040 (143.4) | 1355 | 134.2 | 10.1 | — | — |
| 46 | 182 | 1733 (121.8) | 1818 | 146.6 | 12.4 | 180 | 44.0 |
| 57 | 186 | 2100 (147.6) | 1613 | 145.3 | 11.1 | 178 | 42.4 |
| 59 | 185 | 2140 (150.4) | 1530 | 135.4 | 11.3 | 174 | 39.2 |
| 61 | 185 | 2140 (150.4) | 1493 | 135.7 | 11.0 | 173 | 38.4 |
| 65 | 184 | 2145 (150.8) | 1539 | 1480 | 10.4 | — | — |
| 69 | 184 | 1850 (130.1) | 1428 | 132.2 | 10.8 | — | — |
| 80 STY/ 10 EA/ 10 AA | 185 | 2016 (141.7) | 1464 | 142.1 | 10.3 | 180 | 44.0 |
| 101 | 182 | 2150 (151.1) | 1828 | 147.4 | 12.4 | — | — |
| 102 | 182 | 2100 (147.6) | 1754 | 145.0 | 12.1 | — | — |
| 103 | 182 | 2120 (149.0) | 1784 | 143.9 | 12.4 | — | — |
| 104 | 184 | 2230 (156.8) | 2177 | 154.4 | 14.1 | — | — |
| 105 | 184 | 2125 (149.4) | 1842 | 149.8 | 12.3 | — | — |
| 106 | 183 | 2115 (148.7) | 1939 | 150.3 | 12.9 | — | — |
| 107 | 186 | 2115 (148.7) | 1991 | 152.0 | 13.1 | 172 | 37.6 |
| 108 | 186 | 2110 (148.3) | 1925 | 151.6 | 12.7 | 172 | 37.6 |
| 110 | 186 | 2180 (153.3) | 1996 | 154.7 | 12.9 | 175 | 40 |
| 112 | 186 | 2140 (150.4) | 1935 | 150.0 | 12.9 | 178 | 42.4 |
| 114 | 186 | 2145 (150.8) | 1939 | 151.5 | 12.8 | 178 | 42.4 |
| 115 | 186 | 2155 (151.5) | 1933 | 151.0 | 12.8 | 177 | 41.6 |
| 116 | 186 | 2115 (148.7) | 1935 | 151.2 | 12.8 | 178 | 42.4 |
| 117 | 186 | 2105 (148.0) | 177 | 149.1 | 11.9 | 176 | 40.8 |
| K—120N | 185 | 2145 (150.8) | 1415 | 141.5 | 10.0 | 186 | 50.4 |
| Amoco 18-210 | 186 | 1907 (134.1) | 1622 | 156.0 | 10.4 | 178 | 42.4 |
| Polystyrene | 180 | 1839 (129.2) | 1621 | 132.9 | 12.2 | — | — |
| Metablen P-551 (M&T | 185 | 2285 (160.6) | 1650 | 150.0 | 11.0 | 197 | 57.6 |

TABLE 7-continued

| Polymer No. | Stock Temp. °C. | Back Pressure psi (kg/cm²) | Drive Power watts | Output g/min | Energy Consumption w-min/g | Post Extrudate Swell* mil | % |
|---|---|---|---|---|---|---|---|
| acrylate) | | | | | | | |

*Die I.D. = 0.125"

FIG. 8 is a plot of surface quality versus the molecular weight of the processing aid for various PPAs of the invention and comparative PPAs. Table 8 lists the compositions, molecular weight and softening temperatures of the comparative PPAs. Points on the plot of FIG. 8 are labeled to identify the particular polymer which the point represents. This plot illustrates desirability of the processing aid having a molecular weight of at least 100,000, preferably at least 200,000.

TABLE 8

Compositions and Properties of Comparative PPAs Used in PVC Blends Subjected to Extrusion and Surface Quality Observation

| Polymer No. | Composition | $\overline{Mw}$ (K) | Tg (°C.) |
|---|---|---|---|
| 3 | 97 STY<br>3 MMA | 16 | 87 |
| 6 | 82 STY<br>15 AN<br>3 MAA | 20 | 92 |
| 2 | 97 STY<br>3 MAA | 43 | 94 |
| A1 | 60 STY<br>10 AN<br>20 MMA<br>10 MEM | 48 | 94 |
| PVC | PVC | 83 | 77 |
| A2 | 65 STY<br>30 AN<br>5 MEM | 87 | 103 |
| A3 | 60 STY<br>10 AN<br>20 MMA<br>10 MBM | 103 | 99 |
| A4 | 60 STY<br>10 AN<br>20 MBM<br>10 MBM | 112 | 84 |
| A5 | 65 STY<br>30 AN<br>5 MEM | 166 | 107 |
| A6 | 62 STY<br>22 MAn<br>11 MMA | 170 | 137 |
| 46 | 75 STY<br>25 DEF | 203 | 46 |
| A7 | 55 STY<br>22 MAn<br>23 MMA | 270 | 137 |
| A8 | 42 STY<br>5 MAA<br>53 BA | 340 | 98 |
| 31 | 75 STY<br>15 AN<br>10 DEF | 450 | 92 |
| 64 | 65 STY<br>20 AN<br>15 DEF | 550 | 102 |
| 69 | 75 STY<br>15 AN<br>10 DBF | 600 | 95 |
| 102 | 75 STY<br>15 AN<br>10 DBF | 794 | 87 |
| 104 | 75 STY<br>15 AN<br>10 DBF | 1215 | 90 |

In view of the above, it will be seen that the several objects of the invention are achieved and other advantageous results attained.

As various changes could be made in the above methods without departing from the scope of the invention, it is intended that all matter contained in the above description shall be interpreted as illustrative and not in a limiting sense.

What is claimed is:

1. A granular processing aid adapted to be reduced to a powder and blended with a vinyl halide polymer to produce a composition having superior mechanical processing properties, the granules thereof comprising agglomerates of a particulate terpolymer, said terpolymer having a molecular weight of at least about 100,000 (weight average), as measured by gel permeation chromatography and a glass transition temperature of between about 60° C. and about 100° C., and being adapted for use as a processing aid for a vinyl halide polymer, said terpolymer comprising between about 30% and about 90% by weight of repeating units derived from an olefin, between about 1% and about 30% by weight of diester repeating units derived from a diester of an addition polymerizable unsaturated dicarboxylic aid, and between about 1% and about 40% by weight of repeating units derived from a solubilizing monomer which promotes compatibility of the terpolymer with a vinyl halide polymer, said agglomerates having a particle size of between about 1/64" (0.4 mm) and about 1/16" (1.6 mm).

2. A granular processing aid as set forth in claim 1 wherein said terpolymer comprises between about 60% and about 85% by weight of said olefin, between about 5% and about 20% by weight of said diester, and between about 10% and about 20% by weight of said solubilizing monomer.

3. A granular processing aid adapted to be reduced to a powder and blended with a vinyl halide polymer to produce a composition having superior mechanical processing properties, said granules comprising agglomerates of a particulate terpolymer, said terpolymer comprising between about 30% and about 90% by weight of repeating units derived fronm an olefin, between about 1% and about 30% by weight of diester repeating units derived from a diester of an addition polymerizable unsaturated dicarboxylic acid, and between about 1 and about 30% by weight of repeating units derived from a solubilizing monomer which promotes compatibility of the terpolymer with a vinyl halide polymer, said terpolymer having a non-random distribution of repeating units, a terminal portion of said terpolymer containing a proportion of said solubilizing monomer at least sufficient to impart dispersive compatibility with said vinyl halide polymer, said agglomerates having a particle size of between about 1/64" (0.4 mm) and about 1/16" (1.6 mm).

4. A granular processing aid as set forth in claim 3 wherein said terpolymer has a segmented structure comprising:

a first segment containing between about 30% and about 90% by weight of said olefin, between about 1% and about 30% by weight of said diester and between 0 and about 40% by weight of said solubilizing monomer, and at least one terminal segment comprising between about 10% and about 90% by weight of said olefin, between 0 and about 10% by weight of said diester and between about 10% and about 90% by weight of said solubilizing monomer.

5. A granular processing said as set forth in claim 4 wherein said first segment contains between about 60% and about 80% by weight of olefin, between about 5 and about 20% by weight of said diester and between about 10 and about 20% by weight of said solubilizing monomer, and said terminal segment contains about 60 and about 80% by weight of said olefin and between about 20 and about 40% by weight of said solubilizing monomer.

6. A granular processing aid as set forth in claim 5 wherein said terpolymer has a glass transition temperature of between about 60° and about 100° C. and a molecular weight of at least about 500,000 (weight average), as measured by gel permeation chromatography and comprises between about 14 and about 18 parts by weight dibutyl fumarate per 100 parts by weight of perpolymer, and wherein said terminal segment contains between about 4 and about 8 parts by weight acrylonitrile and between about 12 and about 16 parts by weight styrene per 100 parts by weight of said terpolymer.

7. A granular processing aid as set forth in claim 6 wherein said segmented terpolymer has a molecular weight of between about 800,000 and about 1,500,000 and a glass transition temperature of between about 80° and about 100° C.

8. A particulate terpolymer having a molecular weight of at least about 100,000 (weight average), as measured by gel permeation chromatography and a glass transition temperature of between about 60° C. and about 100° C. and adapted for use as a processing aid for a vinyl halide polymer, said terpolymer comprising between about 30% and about 90% by weight of diester repeating units derived from styrene, between about 1% and about 30% by weight of repeating units derived from a dialkyl fumarate and between about 1% and about 40% by weight of repeating units derived from acrylonitrile which promotes compatibility of the terpolymer with a vinyl halide polymer, said terpolymer having a nonrandom distribution of repeating units, a terminal portion of said terpolymer containing a proportion of said acrylonitrile monomer at least sufficient to impart dispersive compatibility with said vinyl halide polymer.

9. A granular processing aid adapted to be reduced to a powder and blended with a vinyl halide polymer to produce a composition having superior mechanical processing properties, the granules thereof comprising agglomerates of a particulate terpolymer, said terpolymer having a molecular weight of at least about 100,000 (weight average), as measured by gel permeation chromatography and a glass transition temperature of between about 60° C. and about 100° C., and being adapted for use as a processing aid for a vinyl halide polymer, said terpolymer comprising between about 30% and about 90% by weight of repeating units derived from styrene, between about 1% and about 30% by weight of diester repeating units derived from a dialkyl fumarate and between about 1% and about 40% by weight of repeating units derived from acrylonitrile which promotes compatibility of the terpolymer with a vinyl halide polymer, said terpolymer having a nonrandom distribution of repeating units and said agglomerates having a particle size of between about 1/64" (0.4 mm) and about 1/16" (1.6 mm).

10. A particulate polymer having a molecular weight of at least about 100,000 (weight average), as measured by gel permeation chromatography and a glass transition temperature of between about 60° C. and about 100° C., said polymer comprising between about 30% and about 90% by weight of repeating units derived from an olefin, between about 1% and about 30% by weight of diester repeating units derived from a diester of an addition polymerizable unsaturated dicarboxylic acid, between about 1% and about 40% by weight of repeating units derived from a solubilizing monomer which promotes compatibility of the polymer with a vinyl halide polymer and about 0.01% and about 5% by weight repeating units derived from a free addition polymerizable dicarboxylic acid, said polymer having a nonrandom distribution of repeating units, a terminal portion of said polymer containing a proportion of said solubilizing monomer at least sufficient to impart dispersive compatibility with said vinyl halide polymer.

11. A particulate polymer having a molecular weight of at least about 100,000 (weight average), as measured by gel permeation chromatography and a glass transition temperature of between about 60° C. and about 100° C., said polymer comprising between about 30% and about 90% by weight of repeating units derived from an olefin, between about 1% and about 30% by weight of diester repeating units derived from a diester of an addition polymerizable unsaturated dicarboxylic acid and between about 1% and about 40% by weight of repeating units derived from a solubilizing monomer selected from acrylonitrile or methacrylonitrile.

12. A particulate polymer as in claim 11 wherein the olefin is styrene, the diester is dibutyl fumarate and the solubilizing monomer is acrylonitrile.

13. A granular processing aid adapted to be reduced to a powder and blended with a vinyl halide polymer to produce a composition having superior mechanical processing properties, the granules thereof comprising agglomerates of a particulate polymer, said particulate polymer having a molecular weight of at least about 100,000 (weight average), as measured by gel permeation chromatography and a glass transition temperature of between about 60° C. and about 100° C., said particulate polymer comprising between about 30% and about 90% by weight of repeating units derived from an olefin, between about 1% and about 30% by weight of diester repeating units derived from a diester of an addition polymerizable unsaturated dicarboxylic acid and between about 1% and about 40% by weight of repeating units derived from acrylonitrile or methacrylonitrile and said agglomerates having a particle size of between about 1/64" (0.4 mm) and about 1/16" (1.6 mm).

14. A particulate polymer as in claim 13 wherein the olefin is styrene, the diester is dibutyl fumarate and the solubilizing monomer is acrylonitrile.

15. A particulate terpolymer having a molecular weight of at least about 100,000 (weight average), as measured by gel permeation chromatography and a glass transition temperature of between about 60° C. and 100° C., said terpolymer comprising between about 30% and about 90% by weight of repeating units derived from styrene, between about 1% and about 30% by weight of diester repeating units derived from a dialkyl fumarate, and between about 1% and about 40% by weight of repeating units derived from a solubilizing monomer selected from acrylonitrile or methacrylonitrile.

16. A segmented terpolymer having a molecular weight of at least about 100,000 (weight average), as measured by gel permeation chromatography and a glass transition temperature of between about 60° C. and about 100° C., said terpolymer comprising between about 30% and about 90% by weight of repeating units derived from a vinyl aromatic compound, between about 1% and about 30% by weight of diester repeating units derived from a dialkyl fumarate, and between about 1% and about 40% by weight of repeating units derived from a solubilizing monomer selected from acrylonitrile or methacrylonitrile, said terpolymer having a segmented structure comprising a first segment containing between about 30% and about 90% by weight of said vinyl aromatic compound, between bout 1% and about 30% by weight of said diester and between 0 and about 40% by weight of said solubilizing monomer, and at least one terminal segment comprising between about 10% and about 90% by weight of said vinyl aromatic compound, between 0 and about 10% by weight of said diester and between about 10% and about 90% by weight of said solubilizing monomer.

17. A segmented terpolymer as set forth in claim 16 having a molecular weight of at least about 500,000 and a glass transition temperature of between about 60° C. and about 100° C., comprising between about 14 and about 18 parts by weight of dibutyl fumarate per 100 parts by weight of terpolymer and wherein said terminal segment contains between about 4 and about 8 parts by weight of acrylonitrile and between about 12 and about 16 parts by weight styrene per 100 parts by weight of said terpolymer.

18. The segmented terpolymer of claim 17 having a molecular weight of between about 800,000 and about 1,500,000 and a glass transition temperature between about 80° C. and about 100° C.

19. A segmented terpolymer having a molecular weight of at least about 100,000 (weight average), as measured by gel permeation chromatography and a glass transition temperature of between about 60° C. and about 100° C., said terpolymer comprising between about 30% and about 90% by weight of repeating units derived from styrene between about 1% and about 30% by weight of diester repeating units derived from a dialkyl fumarate, and between about 1% and about 40% by weight of repeating units derived from a solubilizing monomer selected from acrylonitrile or methacrylonitrile, said terpolymer having a segmented structure comprising a first segment containing between about 30% and about 90% by weight of said vinyl aromatic compound, between about 1% and about 30% by weight of said diester and between 0 and about 40% by weight of said solubilizing monomer, and at least one terminal segment comprising between about 10% and about 90% by weight of said vinyl aromatic compound, between 0 and about 10% by weight of said diester and between about 10% and about 90% by weight of said solubilizing monomer.

20. A process for preparing an addition terpolymer comprising the steps of:

a. preparing an emulsion polymerization medium comprising water, a surfactant and a free radical initiator, said medium being heating to a temperature at which the polymerization reaction proceeds;

b. slowly and continuously adding to said medium and copolymerizing therein at a rate such that the progress of the polymerization is limited by the rate of addition of monomers rather than by the kinetics of the polymerization, a vinyl aromatic compound, a dialkyl fumarate, and a solubilizing monomer selected from acrylonitrile and methacrylonitrile, said monomers being added in such relative proportions as to produce a terpolymer comprising between about 60% and about 85% of said vinyl aromatic compound, between about 5% and about 20% by weight of said dialkyl fumarate, and between about 10% and about 20% by weight of said solubilizing monomer;

c. polymerizing said monomers in said medium to produce a latex of said segmented terpolymer.

21. The process set forth in claim 20 wherein said vinyl aromatic compound is styrene.

22. A process for preparing an addition terpolymer comprising the steps of:

a. preparing an emulsion polymerization medium comprising water, a surfactant and a free radical initiator, said medium being heated to a temperature at which the polymerization reaction proceeds;

b. slowly and continuously adding to said medium and copolymerizing therein a vinyl aromatic compound, a dialkyl fumarate and a solubilizing monomer selected from acrylonitrile and methacrylonitrile said monomers being added at a rate such that the progress of the polymerization is limited by the rate of addition of monomers rather than by the kinetics of the polymerization and wherein a segmented polymer is produced by initially adding said monomers in such relative proportions as to produce a terpolymer containing between about 30% and about 90% by weight of said olefin, between about 1% and about 30% by weight of said diester, and between 0 and about 40% by weight of said solubilizing monomer; and thereafter modifying the relative proportions of monomers introduced into the emulsion so as to add to said terpolymer a terminal segment containing between about 10% and about 90% by weight of said olefin, between 0 and about 10% by weight of said diester, and between about 10% and about 90% of said solubilizing monomer; and polymerizing said monomers in said medium to produce a latex of said terpolymer.

23. The process of claim 22 wherein styrene, dibutyl fumarate and acrylonitrile monomers are added in such relative proportions that 100 parts by weight of the terpolymer contains between about 14 and about 18 parts by weight of dibutyl fumarate and, in the terminal segment, between about 4 and about 8 parts by weight acrylonitrile and between about 12 and about 16 parts by weight of styrene.

24. The process of claim 22 wherein, in the formation of said terminal segment, said monomers are added in essentially constant relative proportions.

25. The process as set forth in claim 20 wherein the polymerizate is recovered from the emulsion polymerization medium by spray drying.

26. The process as set forth in claim 20 wherein said surfactant comprises an alkaline metal soap and a coagulating electrolyte solution is mixed with the polymerization medium after the polymerization reaction, whereby the polymerizate agglomerates and precipitates from the emulsion polymerization medium.

27. A process as set forth in claim 26 wherein said precipitated agglomerates are recovered by filtration.

28. The process as set forth in claim 27 wherein said agglomerates are washed with water after recovery from the polymerization medium, thereby removing contaminating metal salts.

* * * * *

UNITED STATES PATENT AND TRADEMARK OFFICE
CERTIFICATE OF CORRECTION

PATENT NO. : 4,547,428
DATED : 10/15/85
INVENTOR(S) : Vladimir Bekker, Wayne J. Buchheim, William Vanderlinde, Donald S. T. Wang It is certified that error appears in the above-identified patent and that said Letters Patent are hereby corrected as shown below:

Col. 9, line 27, change "as" to "an";
" 12, " 40, " "form" to "from";
" 18, " 1, " "1/4" to "3/4";
" 26, " 52, " "fronm" to "from";
" 27, " 11, " "said" to "aid";
" 27, " 27, " "perpolymer" to "terpolymer";
" 27, " 45, after "of" add "diester".

Signed and Sealed this

Nineteenth Day of August 1986

[SEAL]

Attest:

Attesting Officer

DONALD J. QUIGG

Commissioner of Patents and Trademarks